United States Patent
Mamuye et al.

(10) Patent No.: US 12,515,959 B1
(45) Date of Patent: Jan. 6, 2026

(54) METHOD FOR SIZE-CONTROLLED SYNTHESIS OF TRANSITION METAL CYANIDE COORDINATION COMPOUND

(71) Applicant: Natron Energy, Inc., Santa Clara, CA (US)

(72) Inventors: Ashenafi Damtew Mamuye, Saratoga, CA (US); Daniel Friebel, San Carlos, CA (US)

(73) Assignee: Natron Energy, Inc., Santa Clara, CA (US)

( * ) Notice: Subject to any disclaimer, the term of this patent is extended or adjusted under 35 U.S.C. 154(b) by 0 days.

(21) Appl. No.: 19/091,073

(22) Filed: Mar. 26, 2025

Related U.S. Application Data

(60) Provisional application No. 63/773,428, filed on Mar. 17, 2025.

(51) Int. Cl.
*C01C 3/12* (2006.01)
*H01M 10/054* (2010.01)

(52) U.S. Cl.
CPC ............ *C01C 3/12* (2013.01); *H01M 10/054* (2013.01); *C01P 2002/72* (2013.01);
(Continued)

(58) Field of Classification Search
CPC .... C01C 3/12; H01M 10/054; C01P 2002/72; C01P 2002/82; C01P 2004/03;
(Continued)

(56) References Cited

U.S. PATENT DOCUMENTS 9,745,202 B2 * 8/2017 Song .................. H01M 4/58
10,529,987 B1 * 1/2020 Keshavarz ............ H01M 4/58
(Continued)

FOREIGN PATENT DOCUMENTS

WO   WO-2023217705 A1 * 11/2023 .......... H01M 10/054

OTHER PUBLICATIONS

"Prussian White with Near-Maximum Specific Capacity in Sodium-Ion Batteries" by Lim et al., ACS Appl. Energy Mater. 4, pp. 6214-6220 (2021).*
(Continued)

*Primary Examiner* — Bryan D. Ripa
(74) *Attorney, Agent, or Firm* — Patent Law Office Michael E. WOODS; Michael E. Woods

(57) ABSTRACT

Embodiments describe a scalable method for synthesizing Prussian White transition metal cyanide coordination compounds (TMCCC) of the general formula $Na_xFe_y[Fe(CN)_6]_{1-z}$ n $H_2O$ for use in battery electrodes. This method involves the controlled decomposition of sodium hexacyanoferrate decahydrate using formic acid, where particle size distribution is precisely controlled by modulating nucleation and growth. The process also includes a sodiation step using an aqueous buffer and a reducing agent. The synthesized materials exhibit high capacity and enable the commercialization of sodium-ion batteries, with the added benefit of byproduct processing. The method ensures precise regulation of particle size and morphology, leading to structural uniformity, and allows for tailoring tap density to optimize volumetric energy density. The resulting TMCCC demonstrates zero to low vacancy content and has a confirmed monoclinic phase.

17 Claims, 34 Drawing Sheets

(52) U.S. Cl.
CPC ...... *C01P 2002/82* (2013.01); *C01P 2004/03* (2013.01); *C01P 2004/51* (2013.01); *C01P 2004/61* (2013.01); *C01P 2006/11* (2013.01); *C01P 2006/40* (2013.01)

(58) Field of Classification Search
CPC .............. C01P 2004/51; C01P 2004/61; C01P 2006/11; C01P 2006/40
See application file for complete search history.

(56) References Cited

U.S. PATENT DOCUMENTS

| | | |
|---|---|---|
| 10,899,632 B2 | 1/2021 | Brant et al. |
| 2019/0270649 A1* | 9/2019 | Brant .................... C01G 49/009 |
| 2024/0262702 A1* | 8/2024 | Li ............................ C01C 3/12 |

OTHER PUBLICATIONS

Lim, Cheryldine QX, and Zhi-Kuang Tan. "Prussian White with nearmaximum specific capacity in sodium-ion batteries." ACS Applied Energy Materials 4.6 (2021):6214-6220.

* cited by examiner

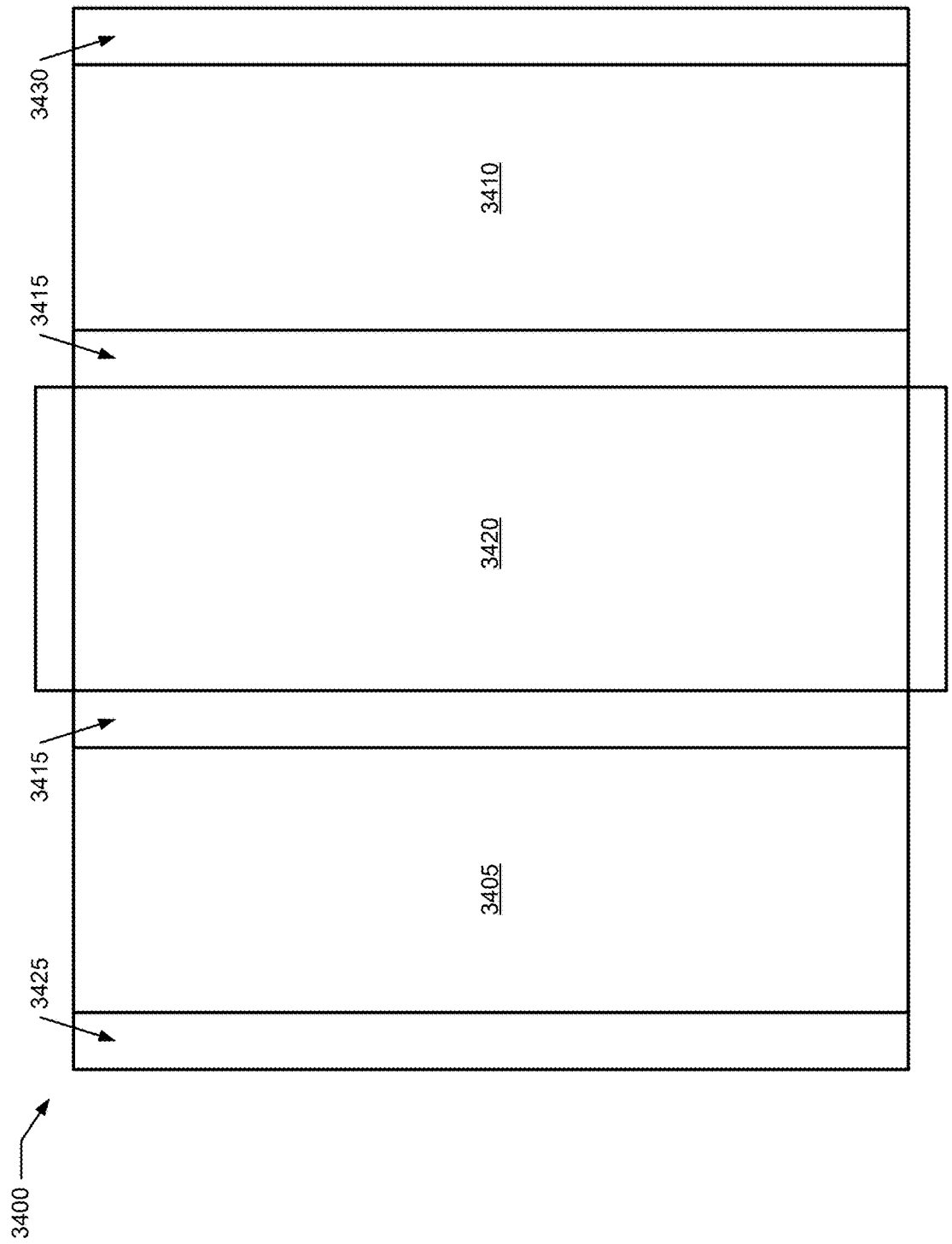

METHOD FOR SIZE-CONTROLLED SYNTHESIS OF TRANSITION METAL CYANIDE COORDINATION COMPOUND

CROSS REFERENCE TO RELATED APPLICATIONS

This application claims the benefit of U.S. Provisional Application 63/773,428 filed on Mar. 17, 2025, the contents of which are hereby expressly incorporated by reference thereto in its entirety.

FIELD OF THE INVENTION

The present invention relates to a synthesis method, and use, for transition metal cyanide coordination compounds (TMCCC), which may be used as an electrochemically active material in secondary batteries, such as sodium-ion secondary batteries, and more particularly to synthesizing iron-only TMCCC with precise control over particle size and tap density. One aspect of the invention includes an embodiment with a Prussian White TMCCC including Na, Fe, C, H, N, and O, wherein the TMCCC have negligible cyanometallate vacancy content for an application in electrochemical cells, as well as electrodes made with this TMCCC, as well as electrochemical cells made with electrochemically-conductive structures, e.g., electrodes, including TMCCC.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The increasing demand for large-scale energy storage has positioned sodium-ion batteries (SIBs) as a promising alternative to lithium-ion batteries, such as for grid storage, among other uses, due to the global abundance and low cost of sodium. This has driven significant research into various cathode materials, with a particular focus on those offering a balance of performance and affordability. Among the various candidates, transition metal cyanide coordination compounds (TMCCCs), especially Prussian Blue (PB) and its analogues (PBAs), have garnered considerable attention. Their three-dimensional framework structure, bridged by cyanide ligands, allows for the rapid and reversible movement of sodium ions. Within PBAs, iron-only TMCCCs, specifically iron-based hexacyanoferrate (Fe-HCF), are particularly promising due to their cost-effectiveness and notable electrochemical stability.

The synthesis of iron-only TMCCCs faces several challenges. Achieving precise structural control and phase purity is difficult, exemplified by challenges in achieving a desired crystalline structure, for example a rhombohedral phase of Prussian White. The crystal framework is highly sensitive to synthesis conditions, and achieving high crystallinity while avoiding unwanted phases or impurities requires tight control. Another challenge lies in substitution limitations within the PBA framework, particularly the difficulty in substituting the carbon-coordinated iron atom. Furthermore, defect formation, especially $Fe(CN)_6$ vacancies resulting from conventional coprecipitation methods, can disrupt structural integrity and reduce active sites.

Particularly with regards to synthesis, there is a lack of a cost-effective and scalable method for synthesizing iron-only transition metal cyanide coordination compounds (TMCCC) with precise control over particle size, tap density, and low vacancy content. Existing and alternative synthesis methods suffer from several disadvantages that limit their practicality for large-scale production of high-performance TMCCCs for sodium-ion batteries.

One major issue is the inability to adequately control crucial physical properties like particle size and tap density. While some methods might claim control over one of these properties, they often fail to simultaneously achieve the desired range for optimal battery performance alongside controlled chemical composition, particularly low vacancy content and high specific capacity. These physical properties significantly impact both the production process and the final battery performance, with tap density directly affecting the volumetric energy density of the cell.

Another significant problem lies in the existing chemical synthesis routes, particularly those involving mineral acids like hydrochloric, hydrobromic, and hydroiodic acid for the decomposition of sodium hexacyanoferrate. These methods are characterized by lengthy and tedious reaction times, making them difficult to scale for industrial production. Furthermore, the use of these mineral acids leads to severe corrosion of standard stainless steel reactor vessels, necessitating the use of expensive glass-lined or corrosion-resistant alloy reactors, significantly increasing capital costs.

Additionally, many conventional methods involve multi-step procedures that include drying intermediate TMCCC materials and using organic solvents for further reduction steps. These multiple steps add to the complexity and cost of the synthesis process, affecting overall cost efficiency. The use of sodium halide reduction agents in some alternative methods also presents safety concerns and generates waste disposal issues related to elemental iodine or bromine byproducts.

Finally, a critical aspect of the problem is the formation of vacancies within the crystal lattice of TMCCCs during conventional precipitation processes. These vacancies, often occupied by coordinated water, act as positively charged defects that significantly reduce the specific capacity of the material and cause structural instability.

Therefore, a key challenge is to develop a synthesis method that can minimize or eliminate these vacancies while simultaneously controlling particle size and tap density in a cost-effective and scalable manner.

In some solutions to a problem of synthesizing such PBAs as described herein, existing synthesis processes suppress a formation of vacancies by using an excess of alkali metal salts and chelating agents. Additionally, Prussian White (sodium iron (II) hexacyanoferrate (II)) with a low vacancy concentration may be synthesized by mineral acid decomposition of sodium hexacyanoferrate with no adequate synthesis techniques to control particle size and tap density.

Such existing solutions have the following disadvantages:
Mineral acid-based hydrolysis of sodium hexacyanoferrate involves lengthy and tedious reaction times, making scalability difficult. The mineral acids included in REF[1] and REF[3] include hydrochloric, hydrobromic and hydroiodic acid, which are known to cause severe corrosion in stainless steel reactor vessels. Use of these acids would require special reaction vessels with glass lining or special corrosion-resistant alloys, at greatly increased capital cost.

Low cost-efficiency multi-step procedure with drying of intermediate TMCCC material and use of organic solvents for further reduction steps.

Lack of precise particle size control.

Lack of precise tap density control.

While REF[2] appears to disclose TMCCC materials with controlled particle size, this reference does not demonstrate that the preferred particle size range could be obtained while at the same time controlling the composition of the TMCCC to yield a TMCCC with preferred low vacancy content and high specific capacity.

What may be beneficial is a system and method for minimizing or eliminating TMCCC vacancies (e.g., reduction to less than a predetermined threshold metric) while simultaneously controlling particle size and tap density in a cost-effective and scalable manner, as well as implementation of structures and electrochemical cells using materials made by these processes disclosed and reasonably suggested herein.

BRIEF SUMMARY OF THE INVENTION

Disclosed is a system and method for minimizing or eliminating TMCCC vacancies (e.g., reduction to less than a predetermined threshold metric) while simultaneously controlling particle size and tap density in a cost-effective and scalable manner, as well as implementation of structures and electrochemical cells using materials made by these processes disclosed and reasonably suggested herein. The following summary of the invention is provided to facilitate an understanding of some of the technical features related to a new synthesis process, and products made therefrom, and is not intended to be a full description of the present invention. A full appreciation of the various aspects of the invention can be gained by taking the entire specification, claims, drawings, and abstract as a whole. The present invention may be applicable to other TMCCC synthesis processes having a need or advantage to combine high specific capacity and high tap density which enhances cell energy density of products using these synthesized compounds.

An embodiment of the present invention may include a TMCCC synthesis method for controlling each of a set of properties of the synthesized TMCCC, in which the set of properties includes controlled particle size, high tap density, low vacancy content, and high specific capacity.

An embodiment of the present invention may include a TMCCC synthesis method in which the TMCCC for electrochemical energy storage devices is made by the decomposition of $NaFe(CN)_6 \cdot 10\ H_2O$ using tripartite agent (acid, ligand and reducing agent) and further reduced with sodium dithionite.

An embodiment may include a method of producing a Prussian White TMCCC of the general formula $Na_xFe_y[Fe(CN)_6]_{1-z}\ n\ H_2O$ (sometimes it may be referred to as an iron-based or iron-only Prussian White TMCCC allowing for the presence of unintentional/unnecessary additional TMCCC formulations), wherein $0<x\leq2.0$, $y=1.0$, $0\leq z<0.2$, $0\leq n<3.0$, including the steps of: (a) admixing sodium hexacyanoferrate (II) decahydrate and water to produce the initial reaction mixture; (b) adding a first quantity of formic acid to the reaction mixture obtained in (a) in a period of time at a temperature T to produce the reaction mixture at its second stage; (c) holding the reaction mixture obtained in (b) for a period of time at a temperature T to produce reaction mixture at its third stage; (d) adding to the reaction mixture obtained in (c) a second quantity of formic acid over a period of time at a temperature T to produce reaction mixture at its fourth stage; (e) holding the reaction mixture obtained in (d) for a period of time at a temperature T to produce reaction mixture at its final stage; (f) filtering and solvent washing the reaction product obtained in (e) to obtain a TMCCC; (g) admixing buffer and TMCCC obtained in (f) to produce a reaction mixture; and (h) contacting the reaction mixture obtained in (g) with sulfur-containing reducing agent to produce the Prussian White TMCCC; (i) filtering and solvent washing the reaction product obtained in (h) to produce a fully sodiated TMCCC; (j) drying the reaction product obtained in (i) to produce a dry powder of TMCCC; and (k) processing byproducts generated from (a-j) for use in one or more of the method steps (a)-(j).

An embodiment may include a method of producing a transition metal cyanide coordination compounds (TMCCC) of the general formula $Na_xFe_y[Fe(CN)_6]_{1-z}\ n\ H_2O$, including the steps of: (a) decomposing, in a controlled manner, sodium hexacyanoferrate decahydrate in an aqueous solution using formic acid; (b) controlling a particle size distribution of the TMCCC controlling the nucleation rate and separating the stages of nucleation and growth; and (c) sodiating the Prussian White TMCCC using an aqueous buffer and a reducing agent to obtain the final TMCCC product; and further, optionally, wherein one or more of steps (a)-(c) produce a quantity of byproducts such as sodium formate and/or hydrogen cyanide, further including the step of processing a portion of the quantity of byproducts for use in one or more of the steps (a)-(c).

An embodiment of the present invention may include an electrochemical cell, an electrically conductive structure, or other electrochemically active structure including a Prussian White TMCCC made by one or more methods disclosed, described, or suggested herein.

Advantages of some improved TMCCC synthesis embodiments of the present invention may include: (i) an ability to combine high specific capacity and high tap density, resulting in highest possible cell energy density; (ii) a use of recyclable organic acid; (iii) a practical, inexpensive, and efficient method that can be scaled up at industrial scale; and/or (iv) batch-to-batch reproducibility of well controlled particle size and tap density.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 6 illustrates an scanning electron microscope (SEM) image demonstrating a morphology and particle size of the TMCCC obtained in Example 1, with a powder product of Example 1 used for SEM measurements;

FIG. 7 illustrates an SEM image demonstrating a morphology and particle size of the TMCCC obtained in Example 2, with a powder product of Example 2 used for SEM measurements;

FIG. 8 illustrates an SEM image demonstrating a morphology and particle size of the TMCCC obtained in Example 3, with a powder product of Example 3 used for SEM measurements;

FIG. 9 illustrates an SEM image demonstrating a morphology and particle size of the TMCCC obtained in Example 4, with a powder product of Example 4 used for SEM measurements;

FIG. 10 illustrates an SEM image demonstrating a morphology and particle size of the TMCCC obtained in Example 5, with a powder product of Example 5 used for SEM measurements;

FIG. 11 illustrates an SEM image demonstrating a morphology and particle size of the TMCCC obtained in Example 6, with a powder product of Example 6 used for SEM measurements;

FIG. 12 illustrates an SEM image demonstrating a morphology and particle size of the TMCCC obtained in Example 7, with a powder product of Example 7 used for SEM measurements;

FIG. 13 illustrates an SEM image demonstrating a morphology and particle size of the TMCCC obtained in Example 8, with a powder product of Example 8 used for SEM measurements;

FIG. 14 illustrates an SEM image demonstrating the morphology and particle size of the TMCCC obtained in Example 9, with a powder product of Example 9 used for SEM measurements;

FIG. 15 illustrates an SEM image demonstrating a morphology and particle size of the TMCCC obtained in Example 10, with a powder product of Example 10 used for SEM measurements;

FIG. 16 illustrates an SEM image demonstrating a morphology and particle size of the TMCCC obtained in Example 11, with a powder product of Example 11 used for SEM measurements;

FIG. 17 illustrates an SEM image demonstrating a morphology and particle size of the TMCCC obtained in Example 12, with a powder product of Example 12 used for SEM measurements;

FIG. 21 illustrates an attenuated total reflection Fourier-transform infrared spectrum of the TMCCC obtained in Example 1;

FIG. 22 illustrates an attenuated total reflection Fourier-transform infrared spectrum of the TMCCC obtained in Example 2;

FIG. 23 illustrates an attenuated total reflection Fourier-transform infrared spectrum of the TMCCC obtained in Example 3;

FIG. 24 illustrates an attenuated total reflection Fourier-transform infrared spectrum of the TMCCC obtained in Example 4;

FIG. 25 illustrates an attenuated total reflection Fourier-transform infrared spectrum of the TMCCC obtained in Example 5;

FIG. 26 illustrates an attenuated total reflection Fourier-transform infrared spectrum of the TMCCC obtained in Example 6;

FIG. 27 illustrates an attenuated total reflection Fourier-transform infrared spectrum of the TMCCC obtained in Example 7;

FIG. 28 illustrates an attenuated total reflection Fourier-transform infrared spectrum of the TMCCC obtained in Example 8;

FIG. 29 illustrates an attenuated total reflection Fourier-transform infrared spectrum of the TMCCC obtained in Example 9;

FIG. 30 illustrates an attenuated total reflection Fourier-transform infrared spectrum of the TMCCC obtained in Example 10;

FIG. 31 illustrates an attenuated total reflection Fourier-transform infrared spectrum of the TMCCC obtained in Example 11;

FIG. 32 illustrates an attenuated total reflection Fourier-transform infrared spectrum of the TMCCC obtained in Example 12;

FIG. 34 illustrates a generic electrochemical cell constructed with one or more electrochemically-active structures.

DETAILED DESCRIPTION OF THE INVENTION

Figure 1:
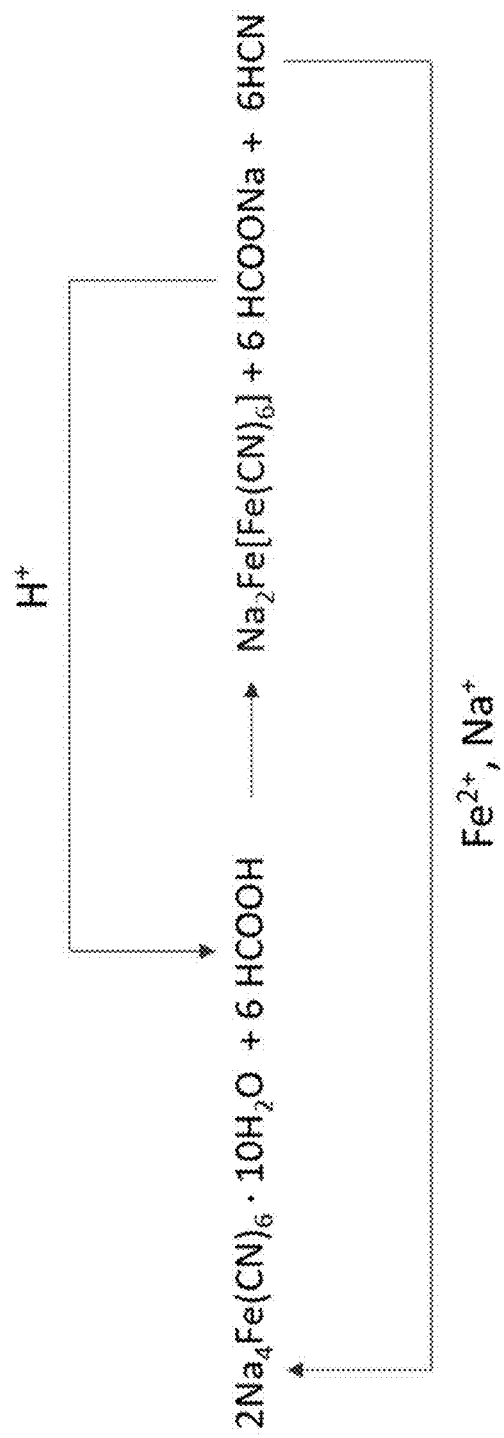
FIG. 1 illustrates a process for producing Prussian White using formic acid and recovering byproducts.

Embodiments of the present invention provide a system and method for minimizing or eliminating TMCCC vacancies (e.g., reduction to less than a predetermined threshold metric) while simultaneously controlling particle size and tap density in a cost-effective and scalable manner. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to certain embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "electrode" in the context of an electrochemical cell may have different meanings and sometimes encompass different sets of components of the electrochemical cell in different contexts and different audiences. For example, the electrode, as comprised by the TMCCC, carbon, and binder, as well as the solvents used in the slurry processing to make the electrode, is typically considered to be entirely separate from a current collector. This electrode structure could be deposited on any number of current collectors having different compositions (aluminum, copper, etc.) or mechanical properties (thickness, surface roughness, and the like). One precise definition would be to refer to an "electrode" as comprising two components: both an "active layer" or "electrode composite" including the TMCCC, carbons, and binders, as well as a current collector, which may in turn have subcomponents such as a special surface coating, or special design features such as physical dimensions. The present application has adopted a special term used herein to avoid some imprecision that is present when referring to an electrode of an electrochemical cell. This term is "electrically conductive structure" and includes electrodes as well as other electrochemically active structures that may be used as an electrode. Some larger structures that encompass an electrode may also be such an "electrically conductive structure" within the meaning of the present application, unless the context would reasonably suggest otherwise to a person having ordinary skill in the art apprised of this disclosure and understanding of the discussion and claims presented herein.

As used herein, the terms "processing byproducts" or alternatively "recycling" in the context of the detailed description of the present invention and claims, means the optional reuse of non Prussian White TMCCC materials produced during the synthesis methods of the disclosed embodiments in the synthesis method itself after the Prussian White TMCCC is synthesized. For example, in FIG. 1, HCOONa and HCN are synthesis byproducts that are processed (or recycled) for use in the primary synthesis production of the Prussian White TMCCC Na$_2$Fe[Fe(CN)$_6$].

Embodiments of the present invention may provide a system and method optimizing electrochemical cell manufacturing by reducing commercialization costs, including reduction of electrolyte costs used in their manufacturing.

Figure 2:
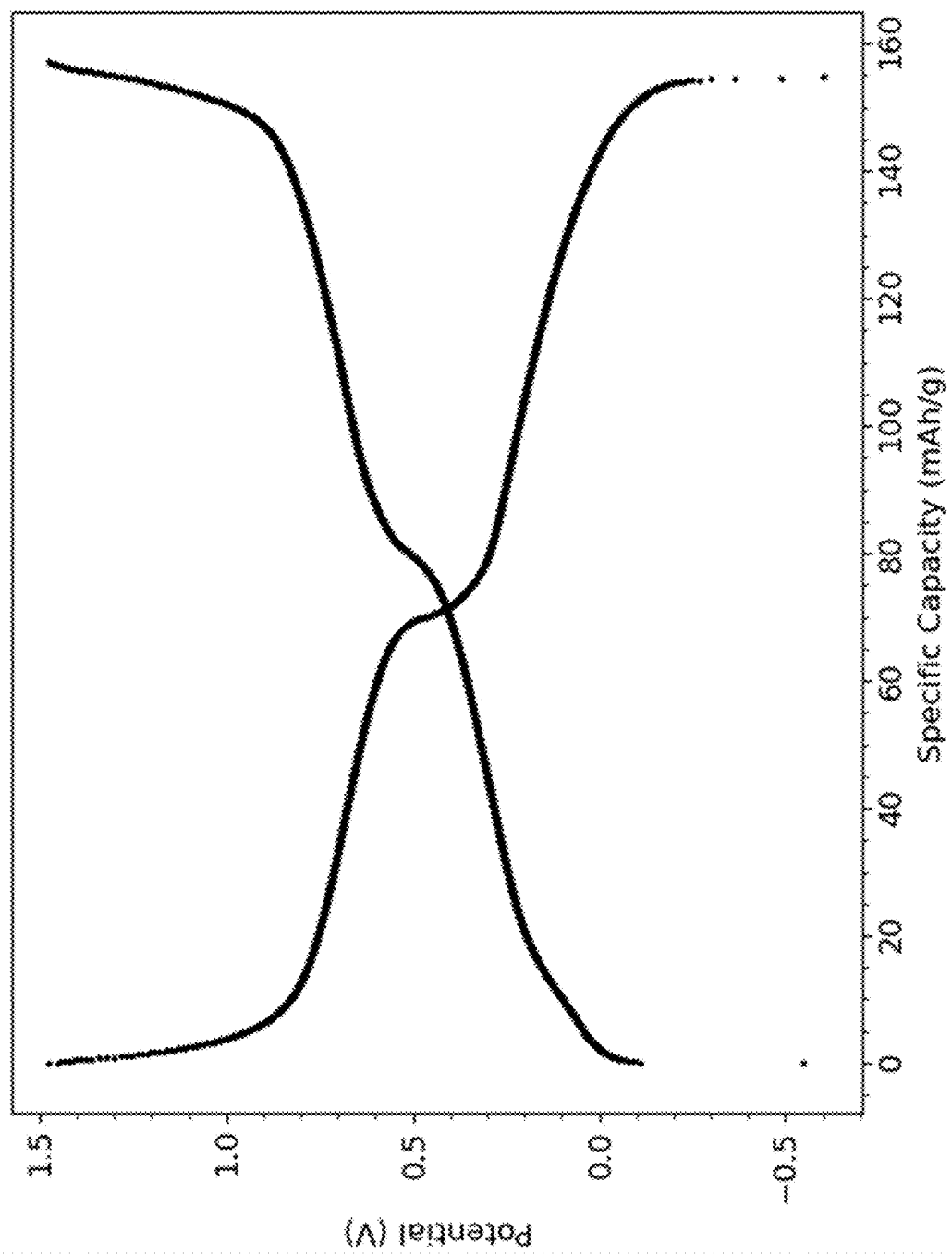
FIG. 2 illustrates a graph representing an electrochemical performance (constant-current charge/discharge profile) of the TMCCC obtained in Example 1.
Figure 3:
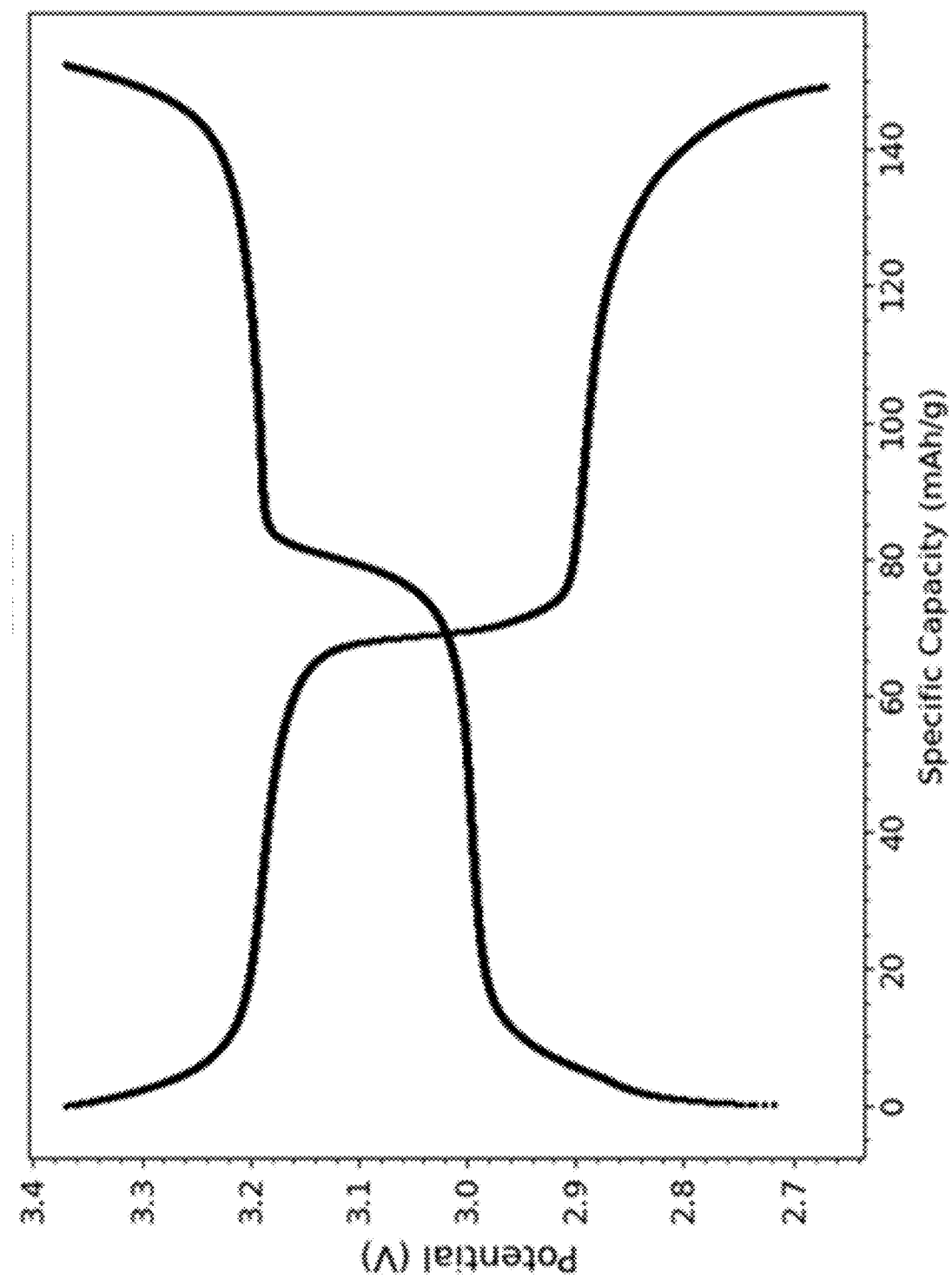
FIG. 3 illustrates a graph representing the electrochemical performance (constant-current charge-discharge potential profile) of the TMCCC obtained in Example 7, measured in a three-electrode cell with an activated carbon counter-electrode and an activated carbon fiber mesh reference electrode.
Figure 4:
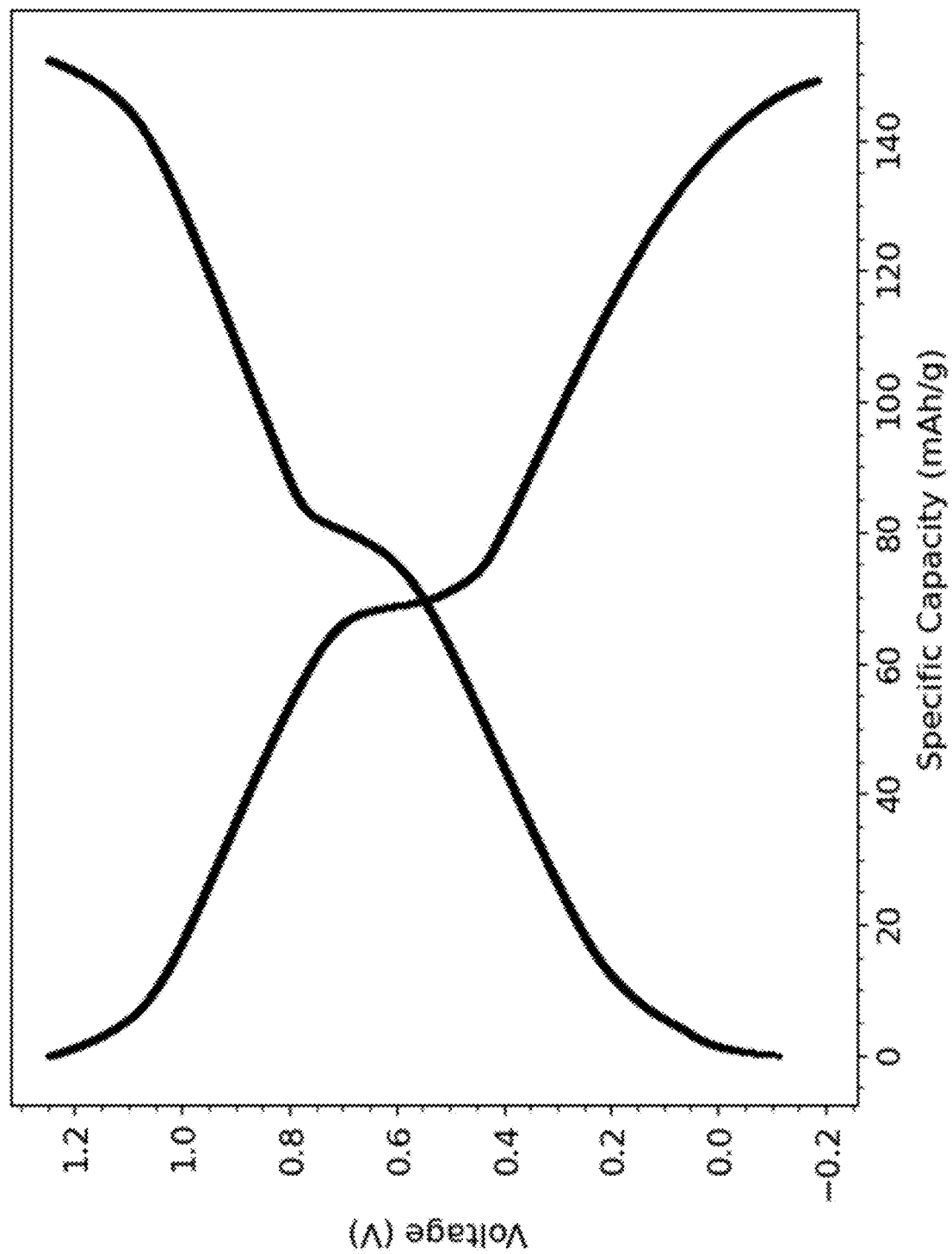
FIG. 4 illustrates a graph representing electrochemical performance (voltage profile during constant-current charge-discharge) of the TMCCC obtained in Example 7, measured in a three-electrode cell with an activated carbon counter-electrode and an activated carbon fiber mesh reference electrode.
Figure 5:
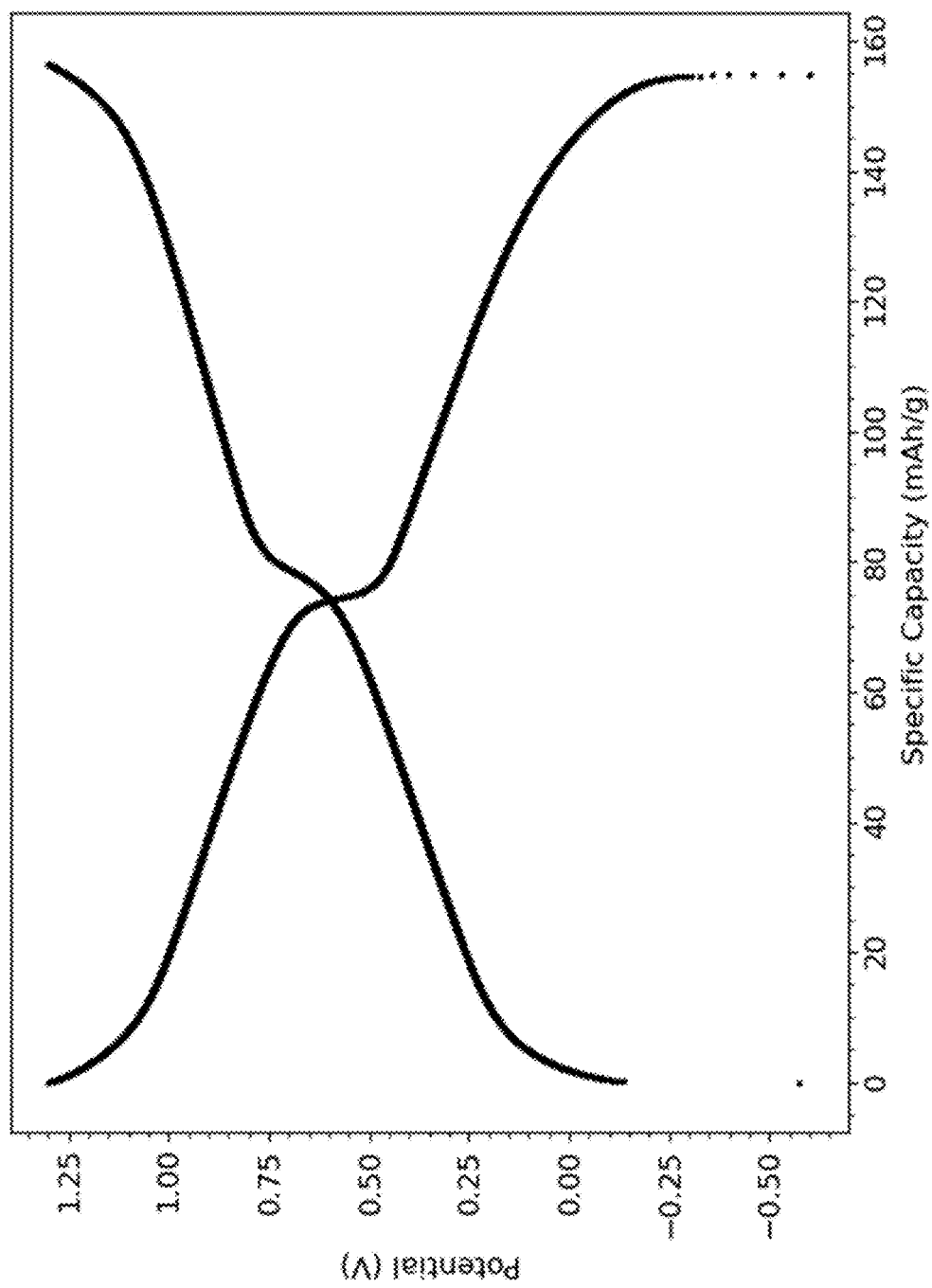
FIG. 5 illustrates a graph representing an electrochemical performance (constant-current charge/discharge voltage profile) of the TMCCC obtained in Example 9.
Figure 6:
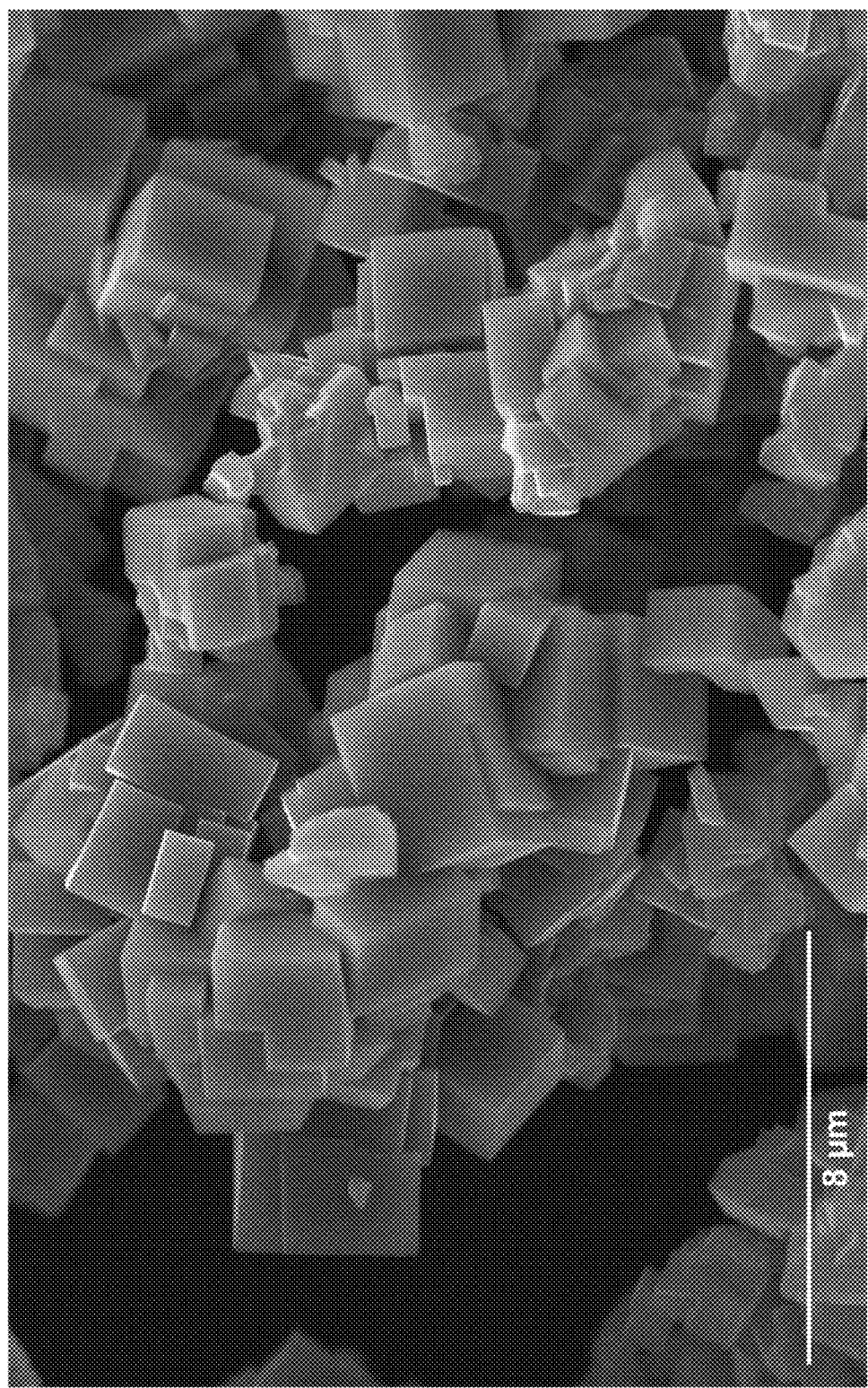
FIG. 6-FIG. 17 illustrate scanning electron microscope (SEM) images demonstrating a morphology and particle size of the TMCCC Examples 1-12.
Figure 7:
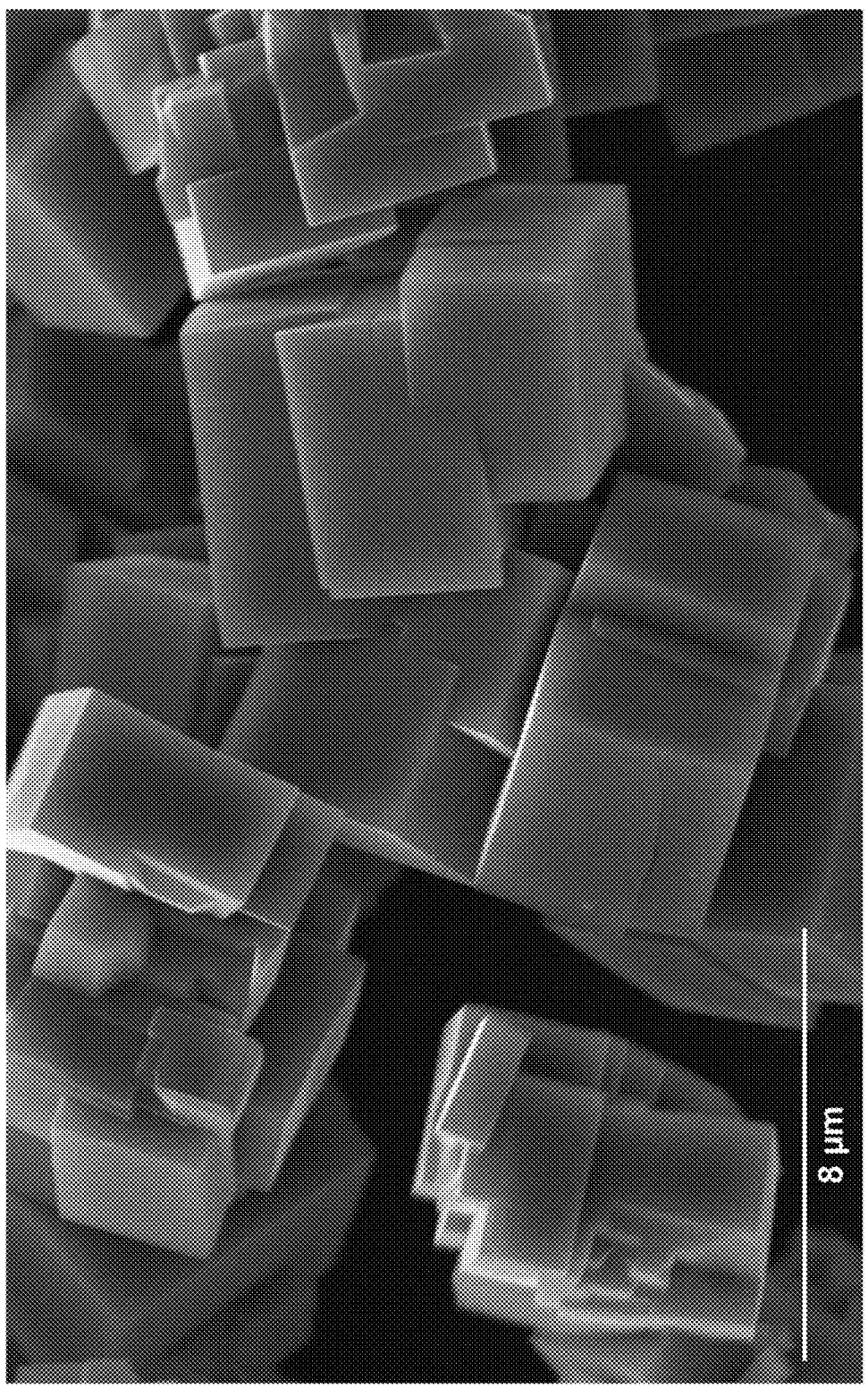
Figure 8:
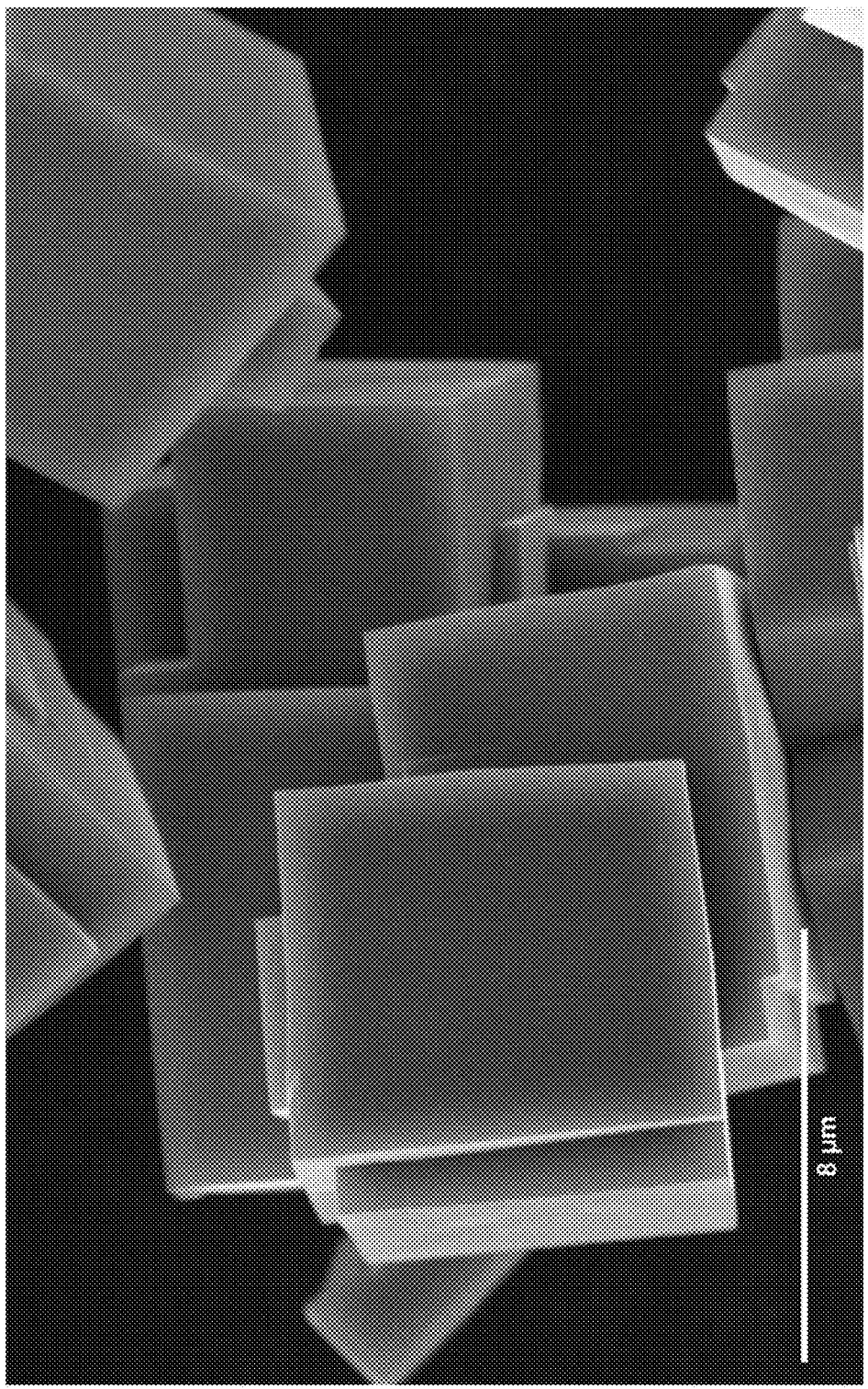
Figure 9:
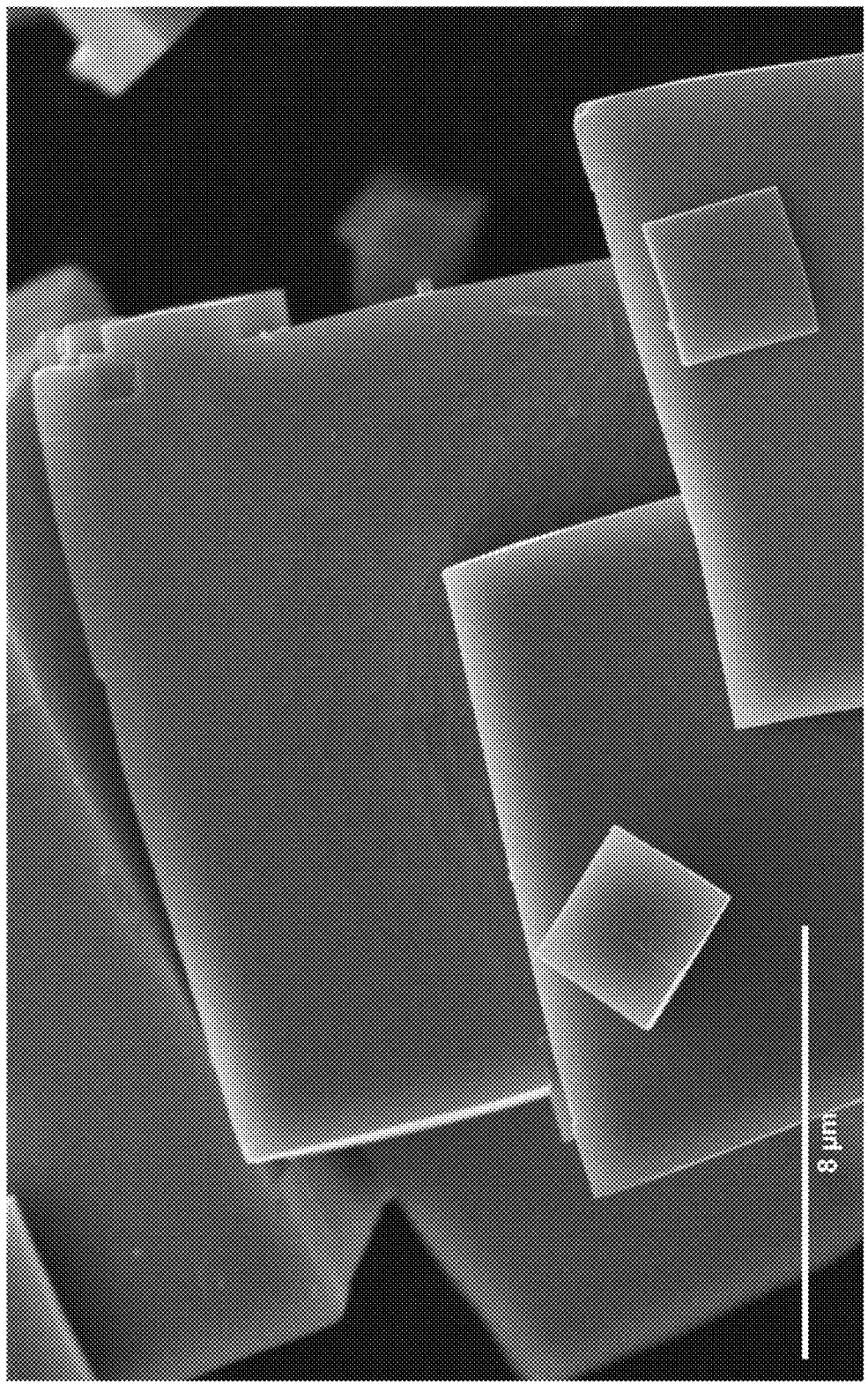
Figure 10:
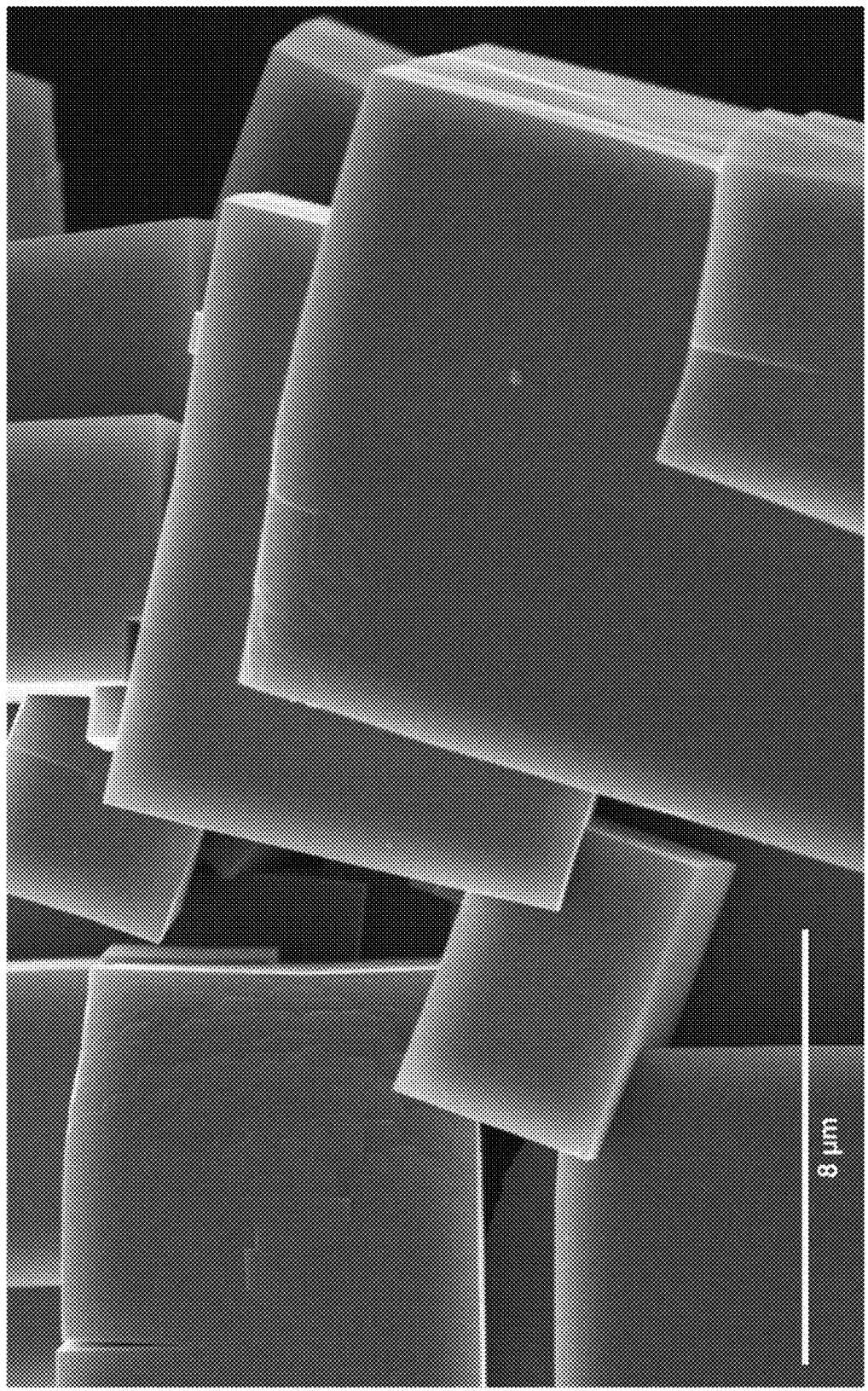
Figure 11:
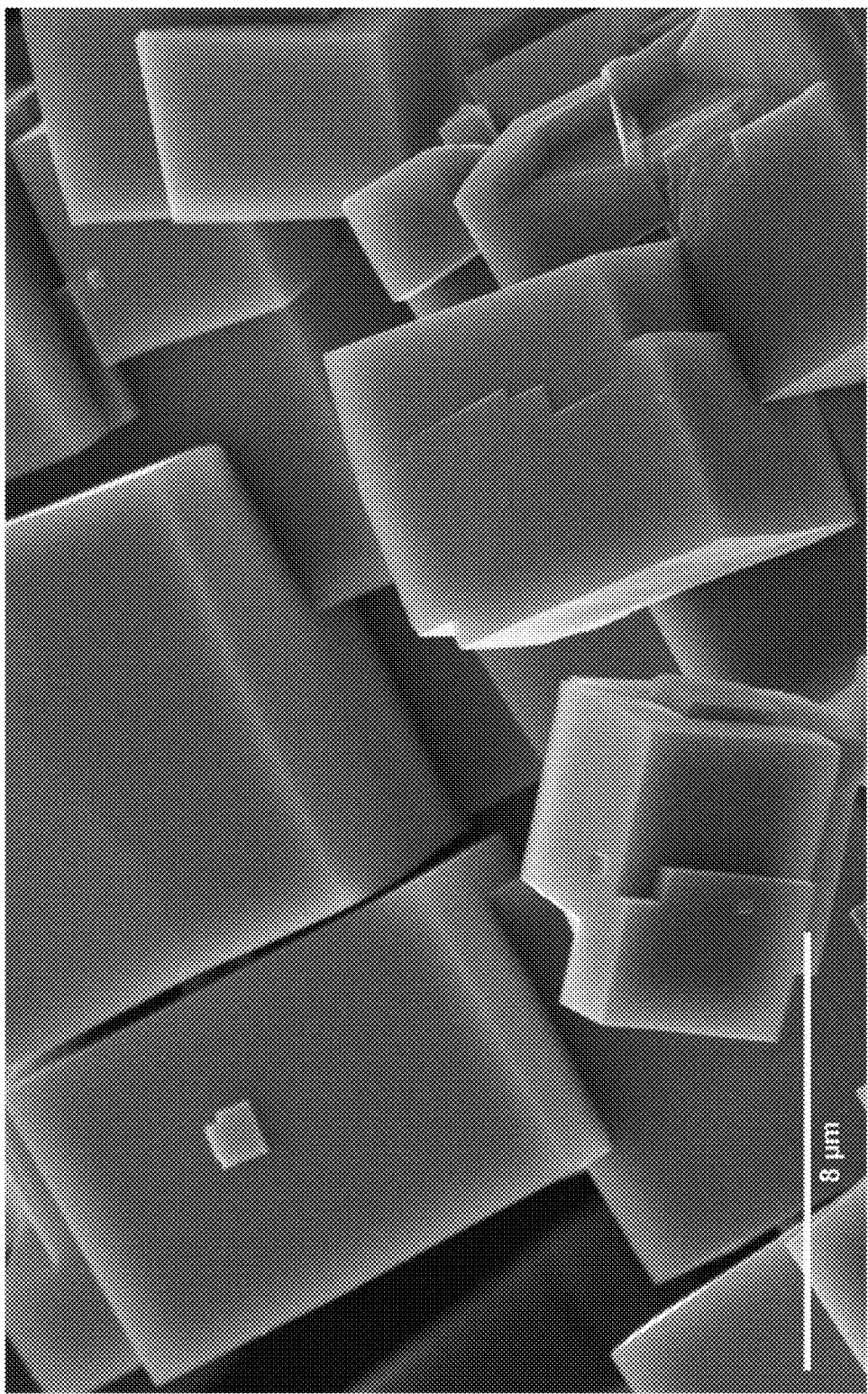
Figure 12:
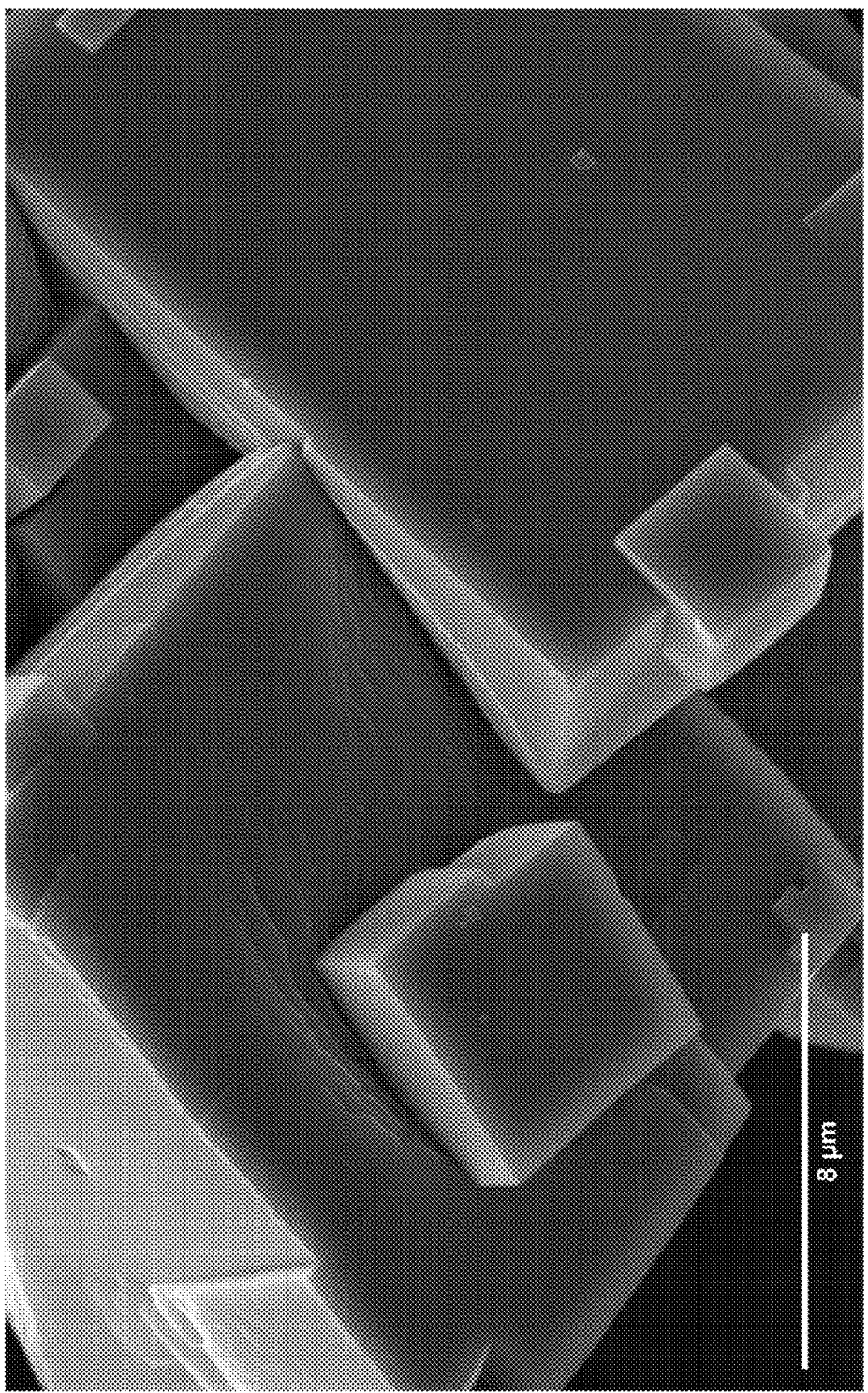
Figure 13:
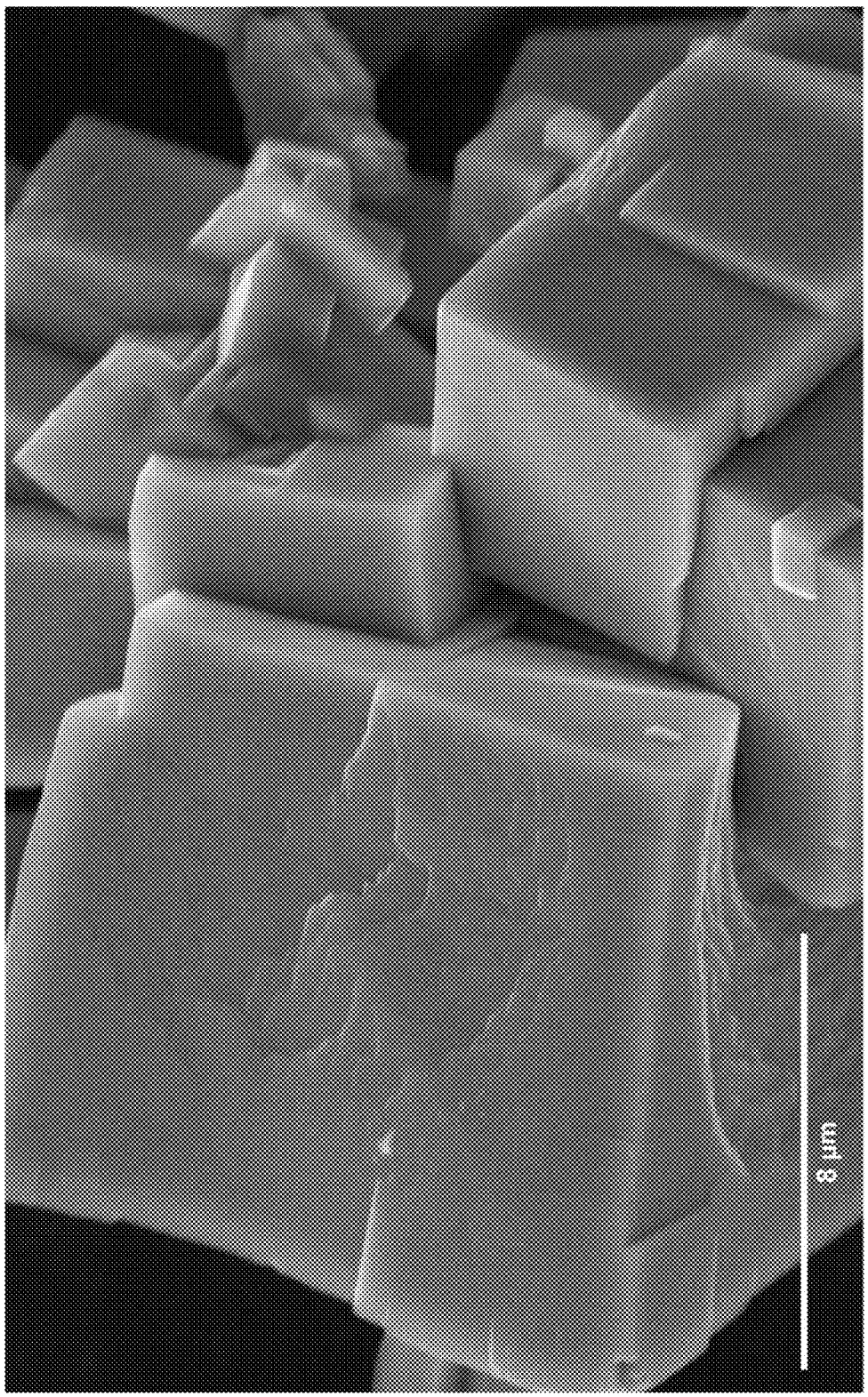
Figure 14:
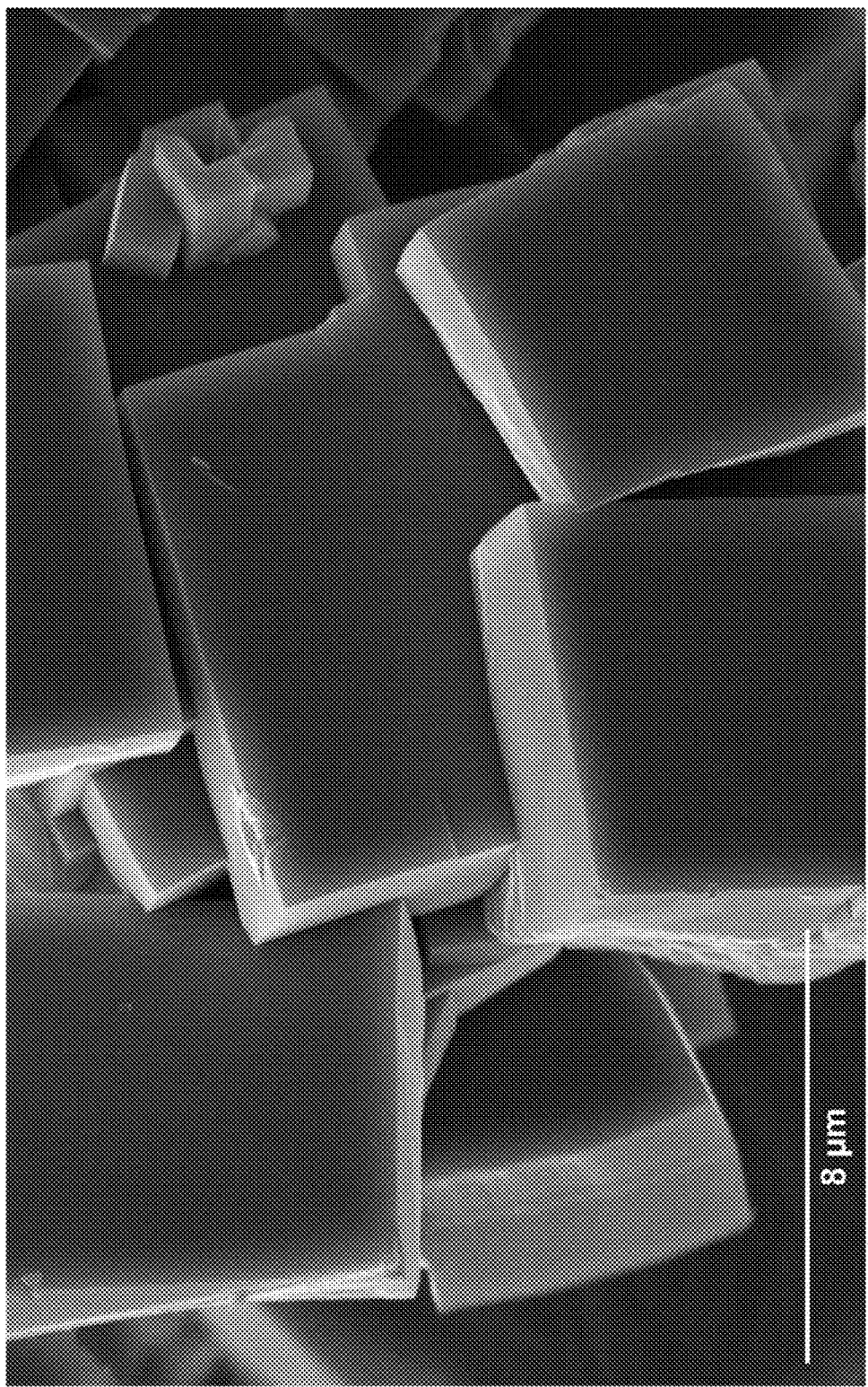
Figure 15:
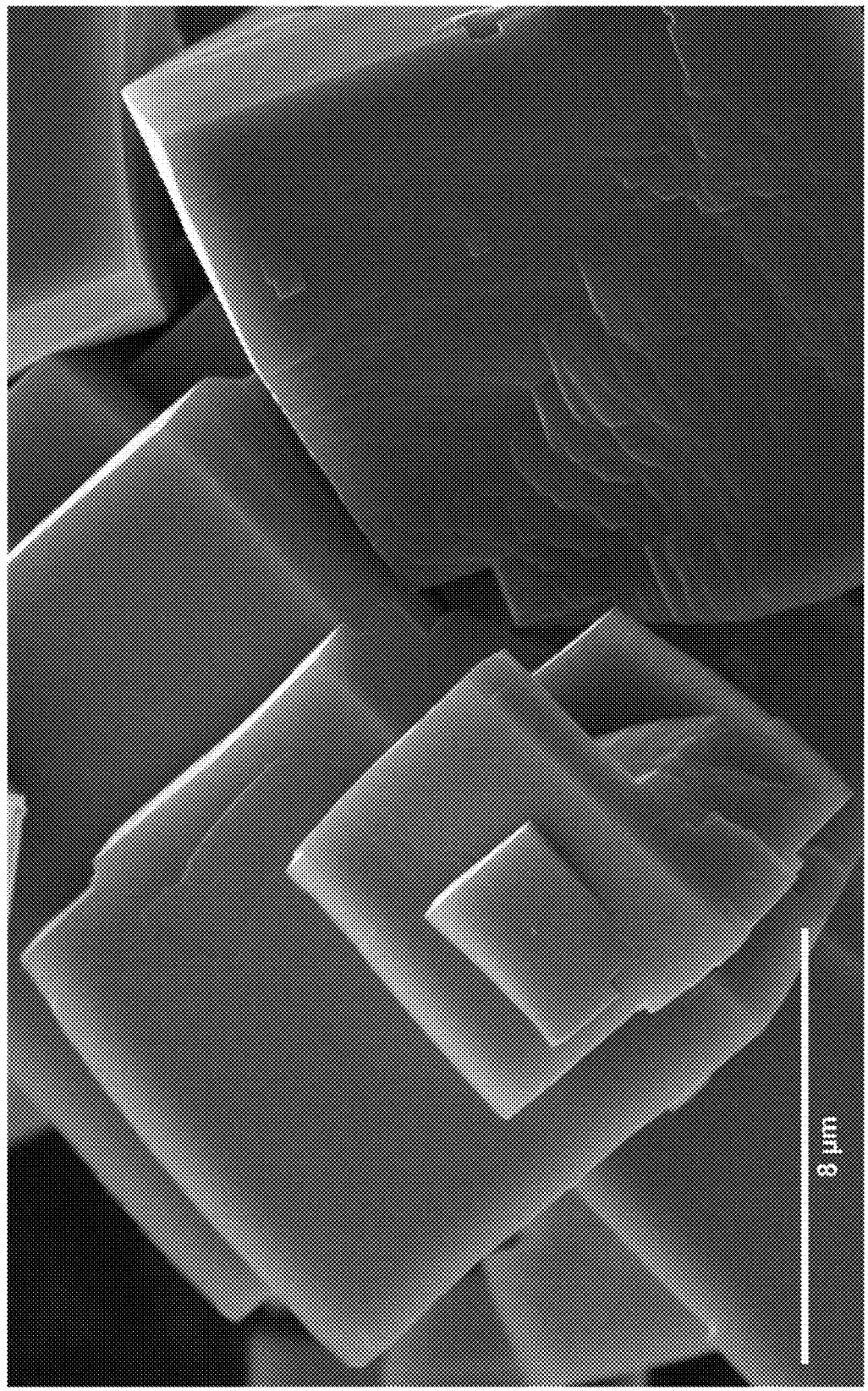
Figure 16:
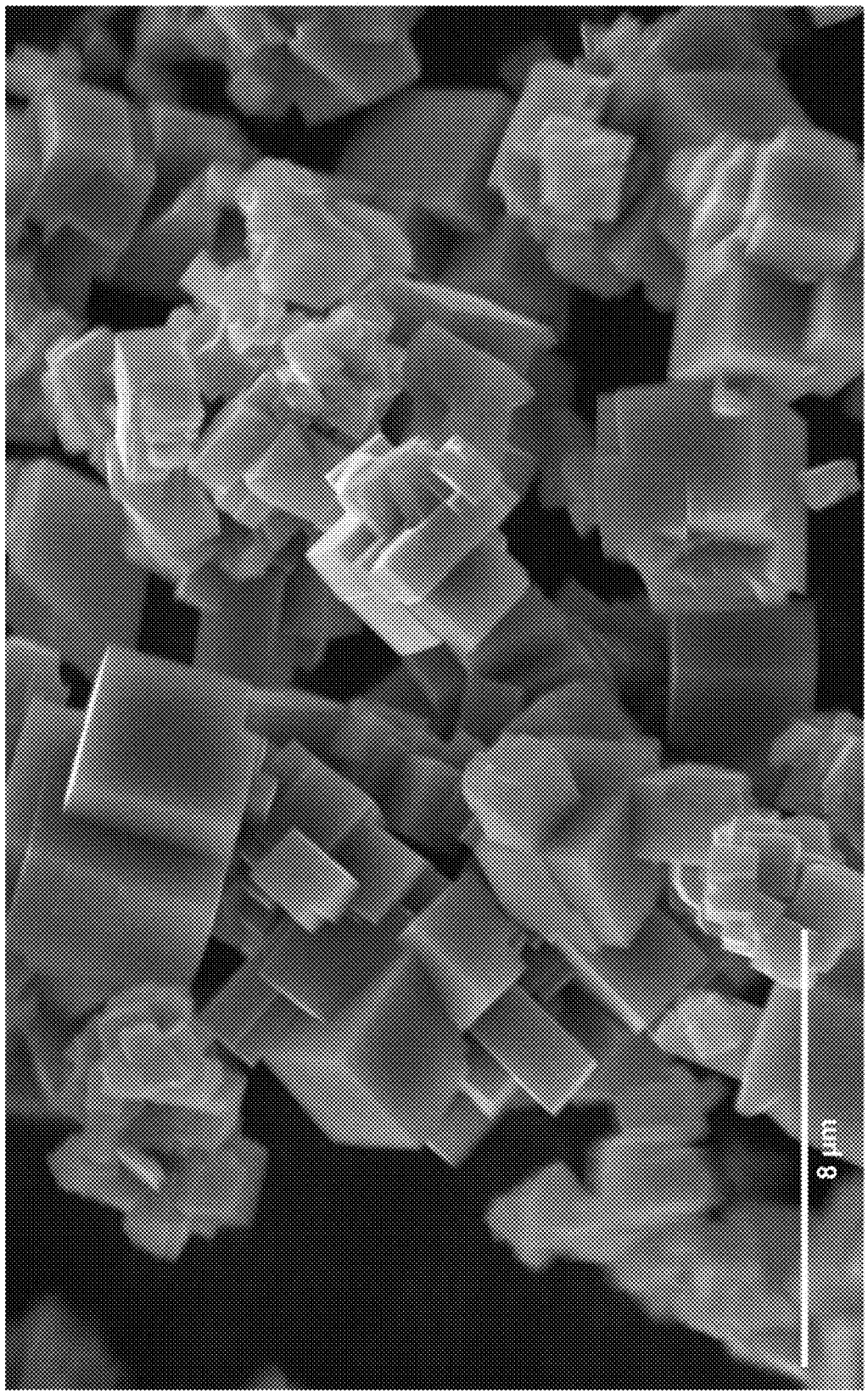
Figure 17:
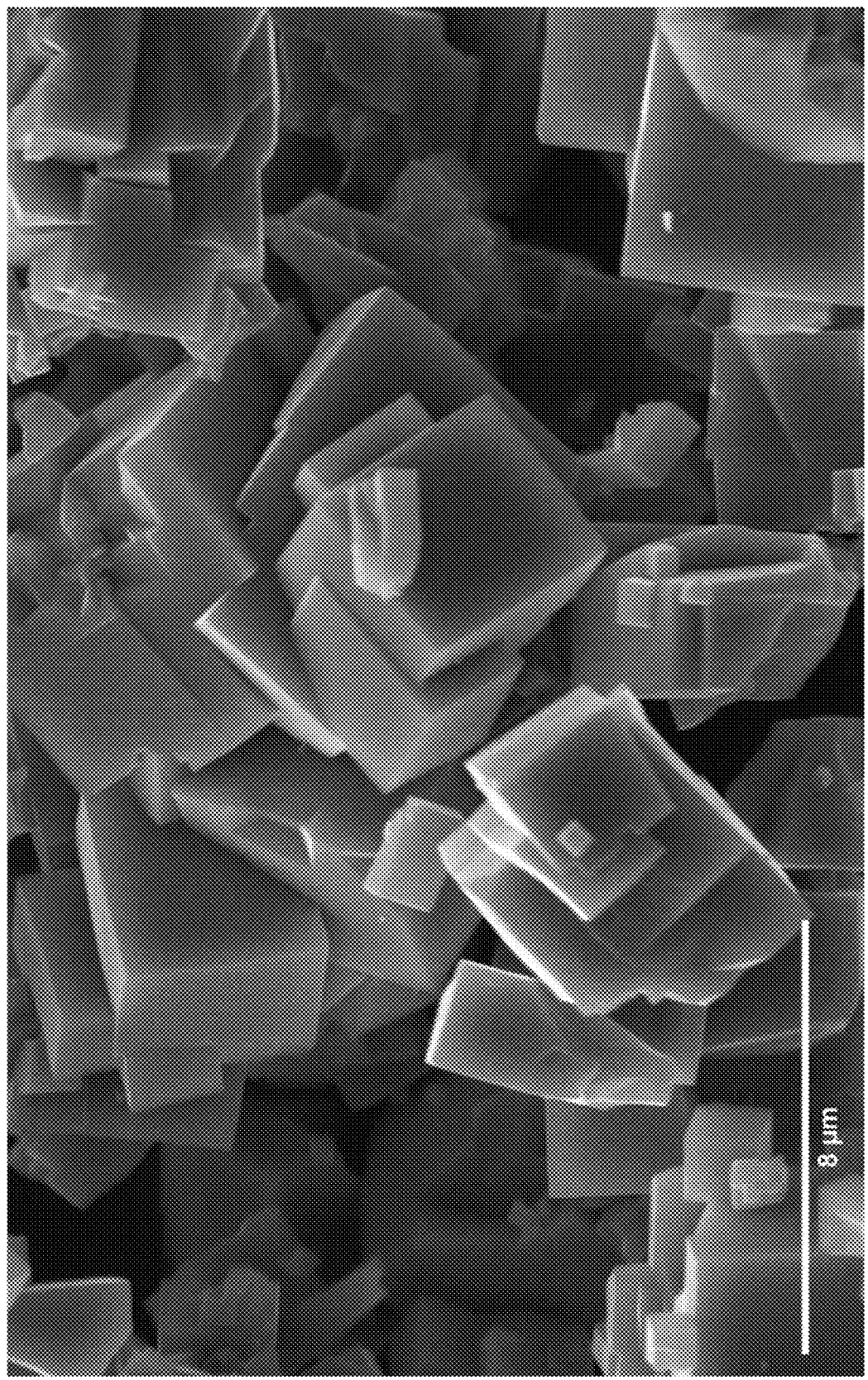
Figure 18:
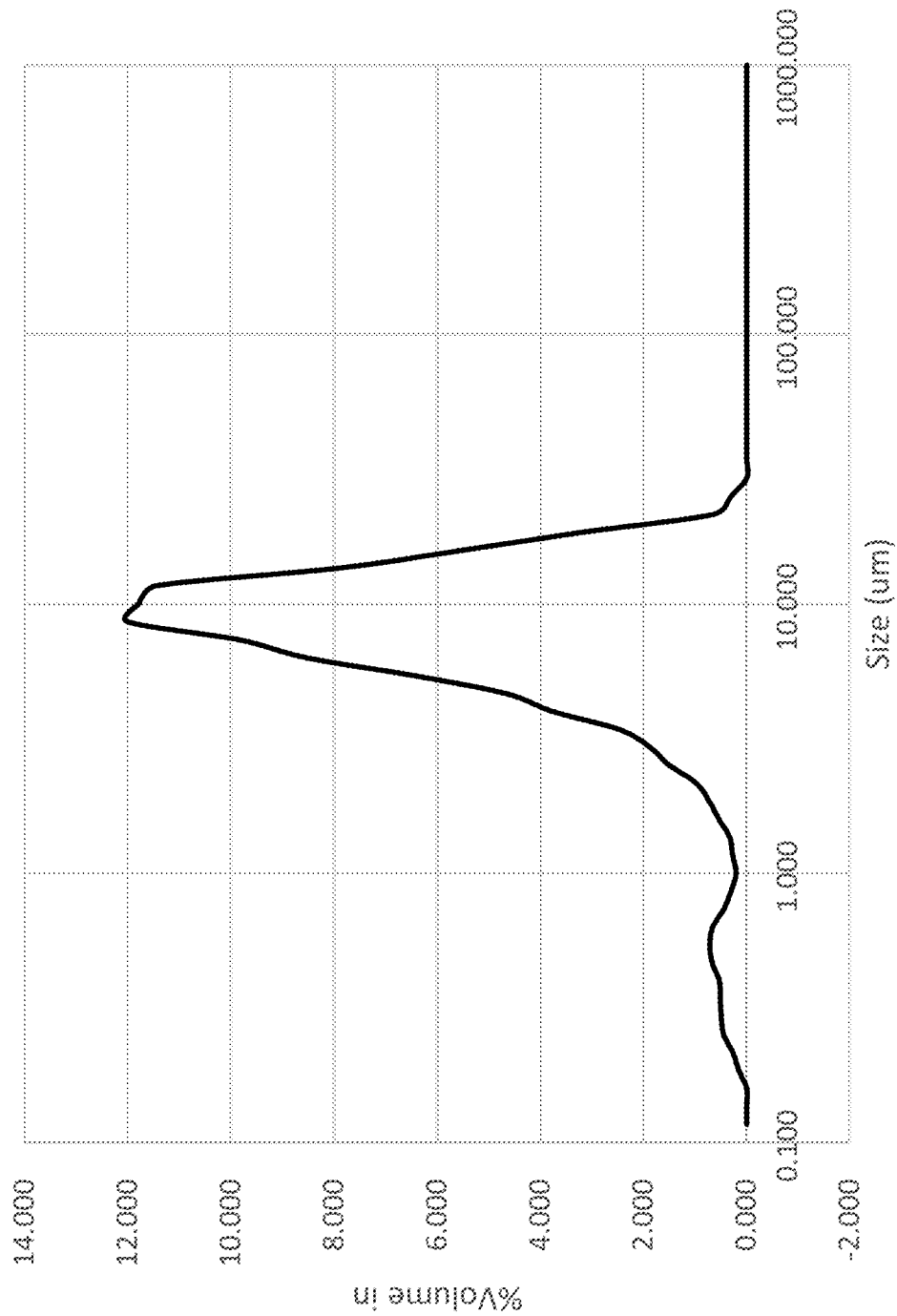
FIG. 18 illustrates a particle size distribution, as determined through laser diffraction measurements, of the TMCCC obtained in Example 1.
Figure 19:
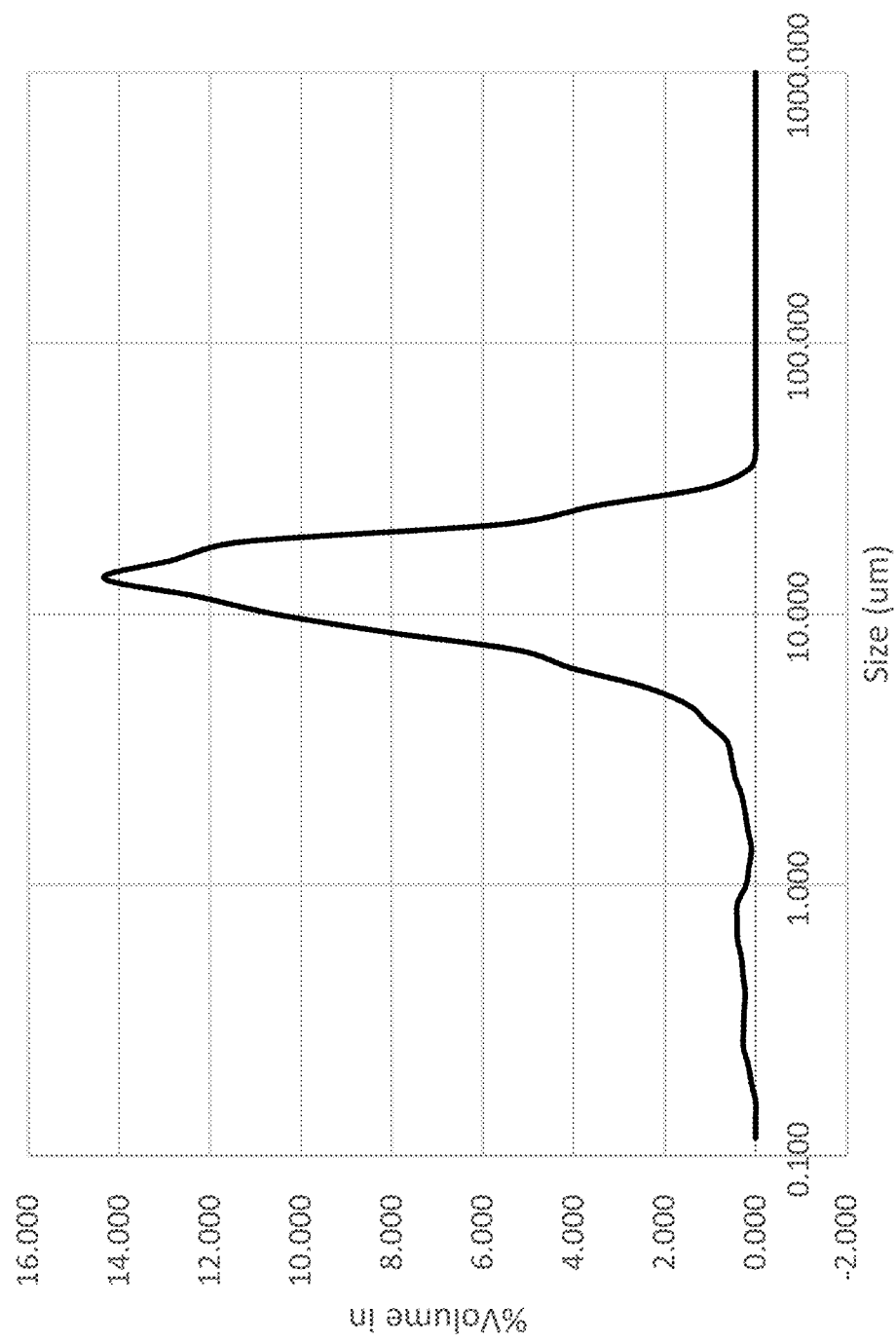
FIG. 19 illustrates a particle size distribution, as determined through laser diffraction measurements, of the TMCCC obtained in Example 2.
Figure 20:
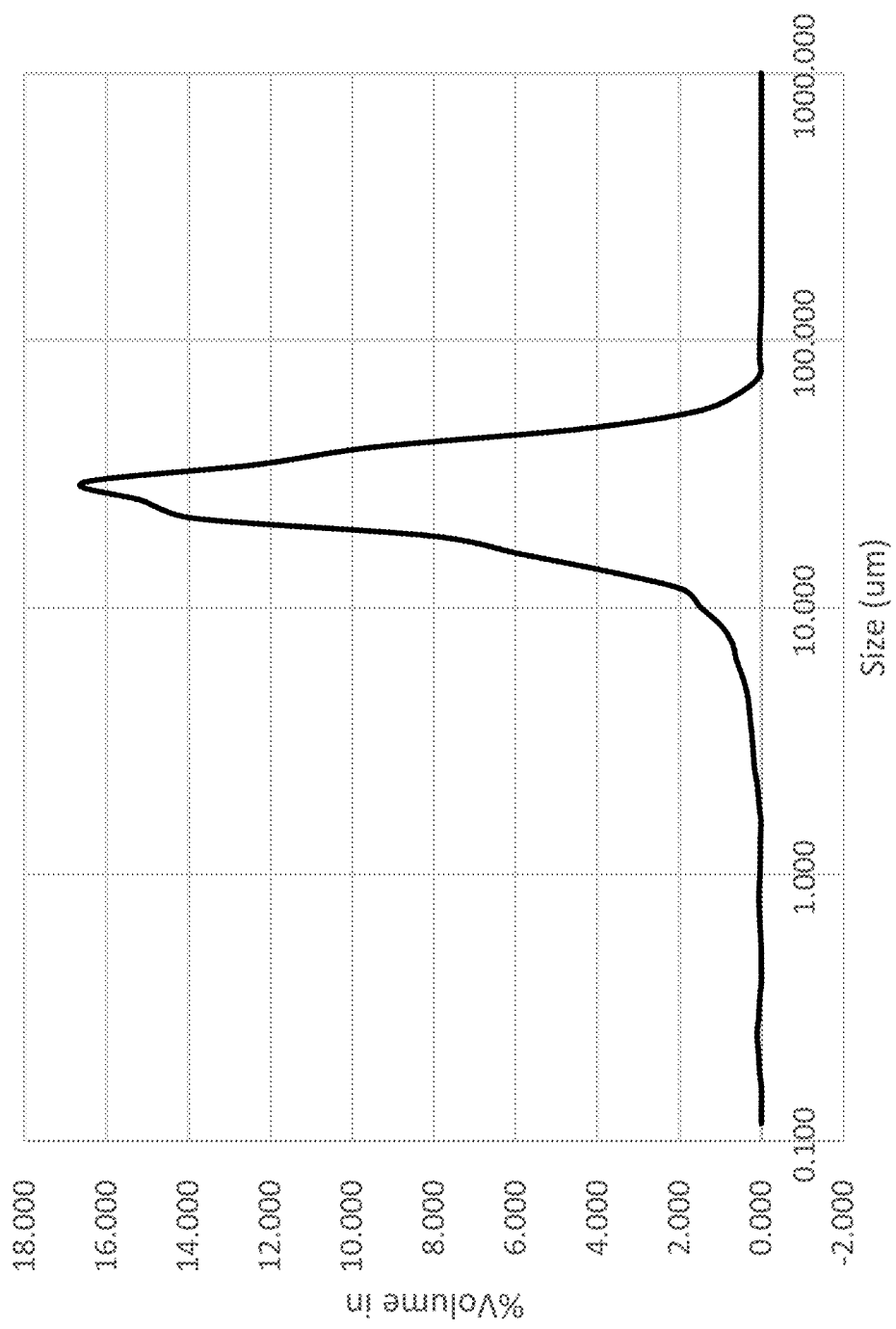
FIG. 20 illustrates a particle size distribution, as determined through laser diffraction measurements, of the TMCCC obtained in example 7.
Figure 21:
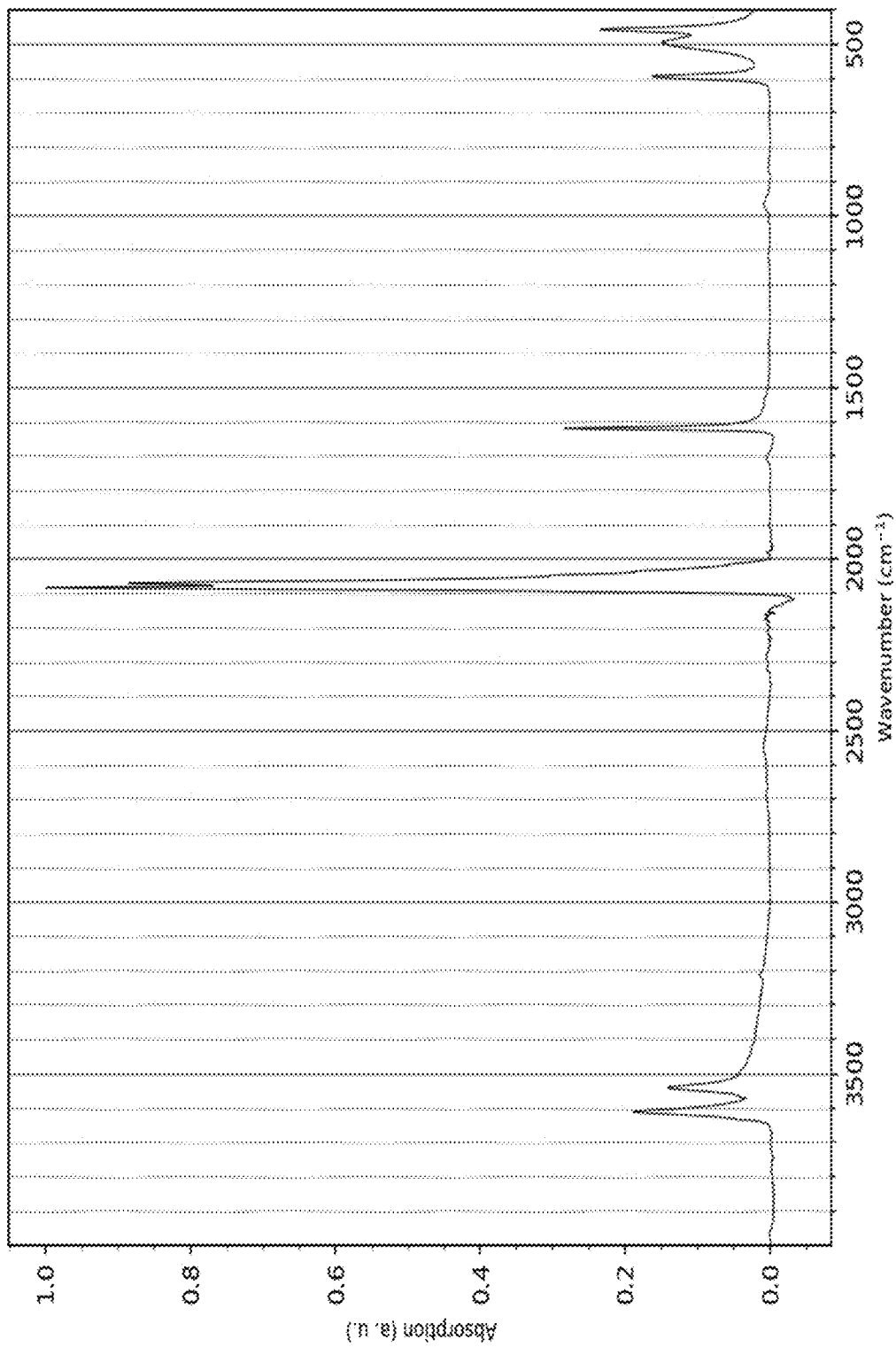
FIG. 21-FIG. 32 illustrate attenuated total reflection Fourier-transform infrared spectra of the TMCCC obtained in Example 1-Example 12.
Figure 22:
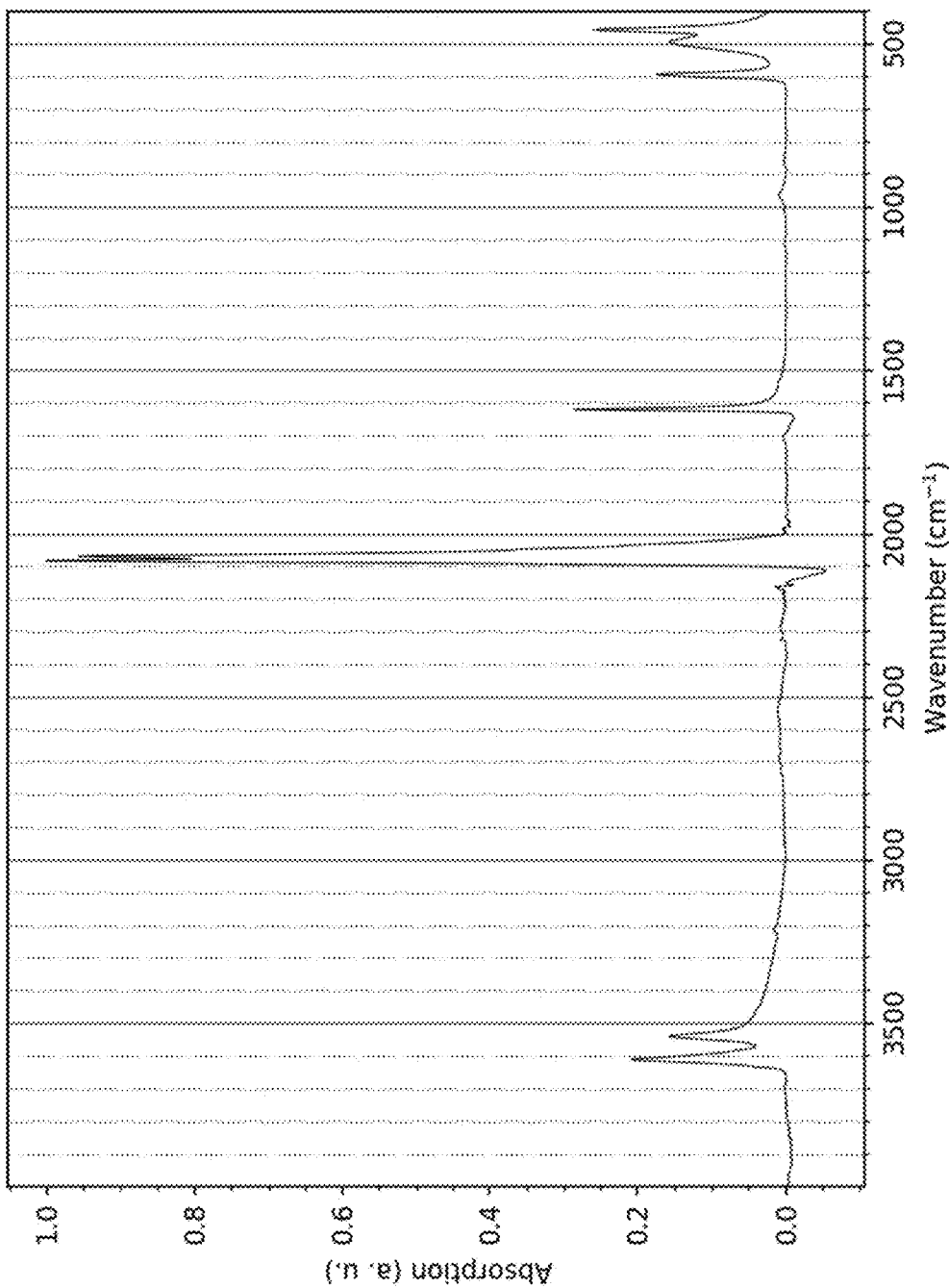
Figure 23:
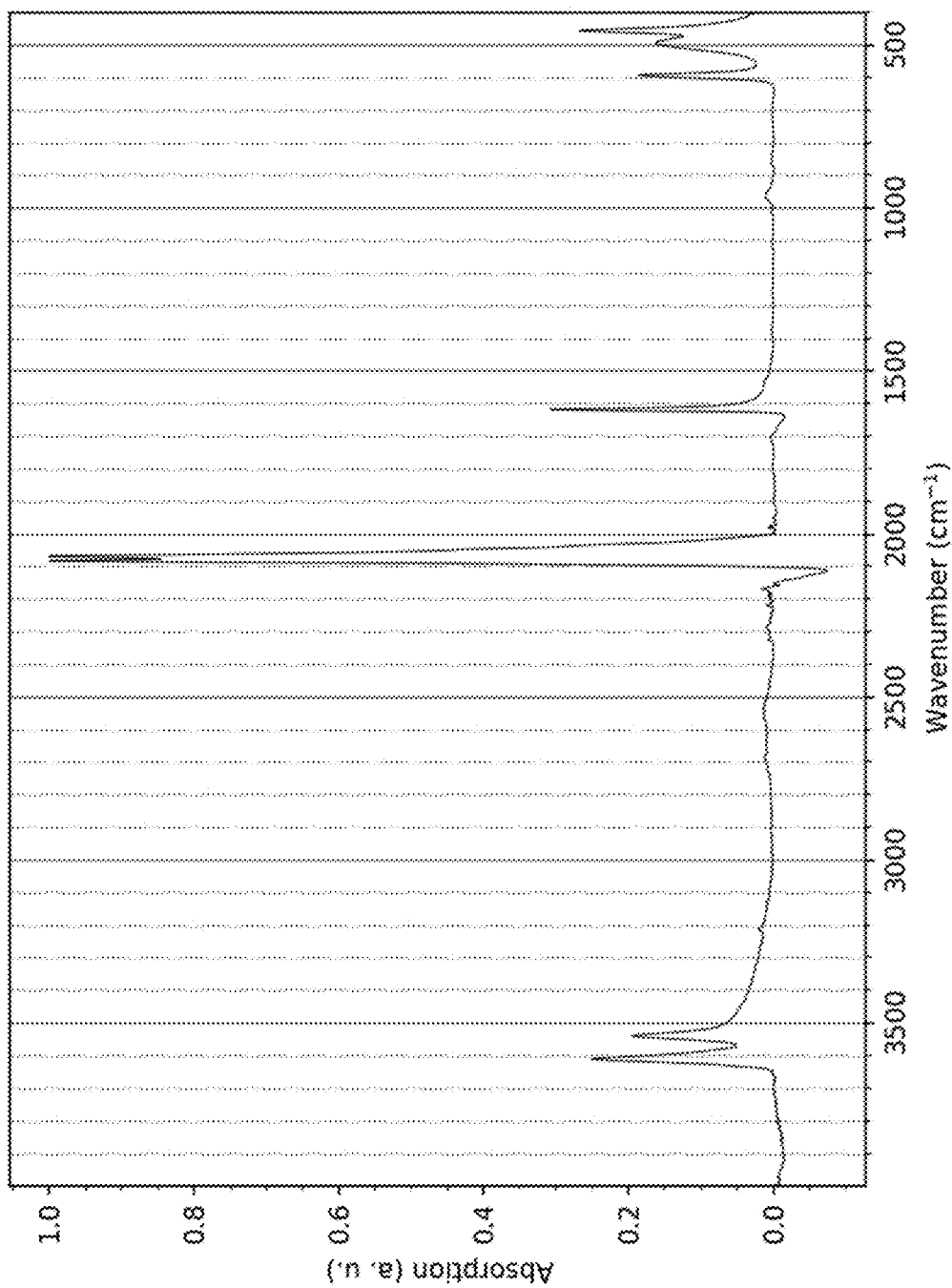
Figure 24:
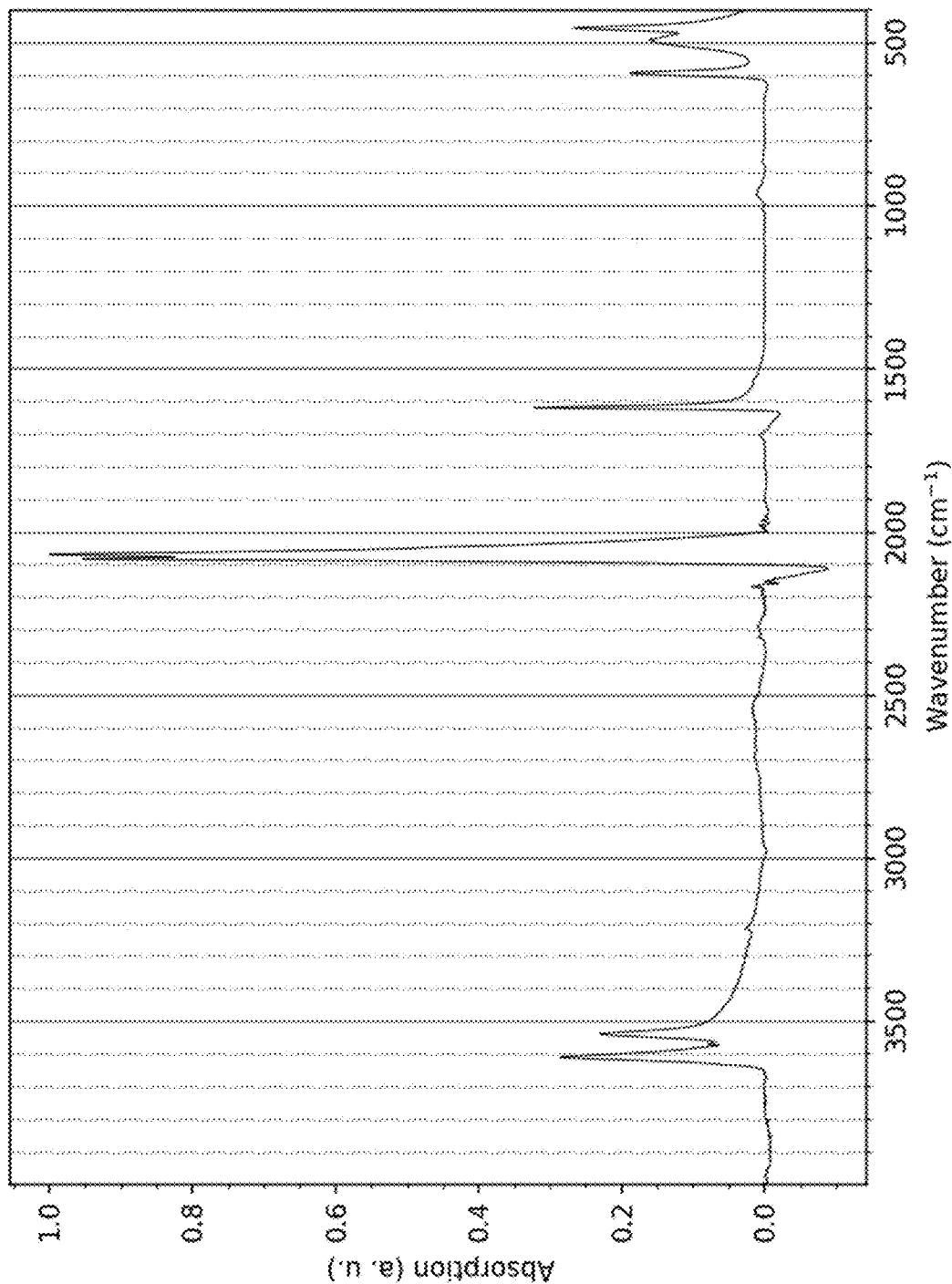
Figure 25:
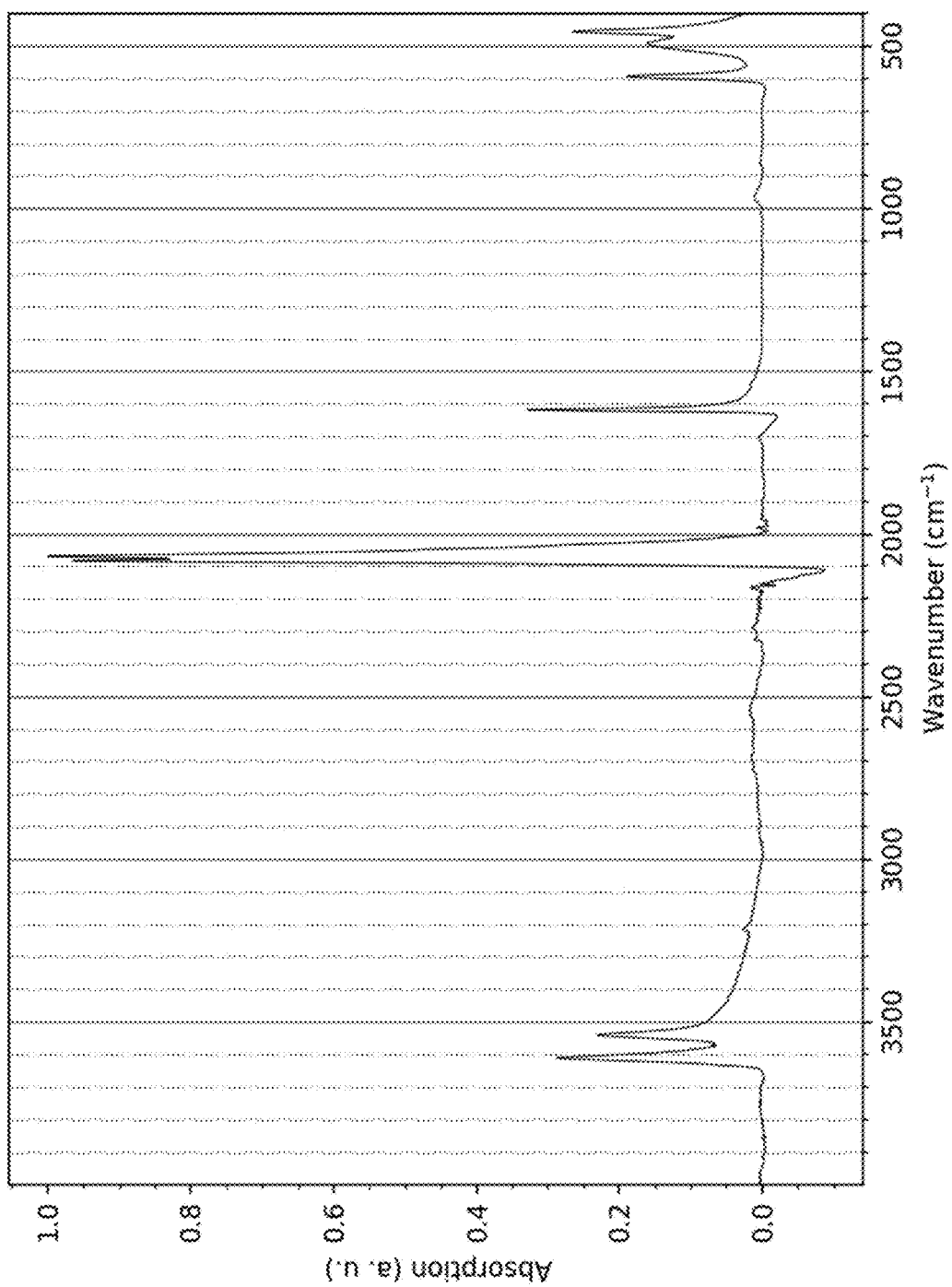
Figure 26:
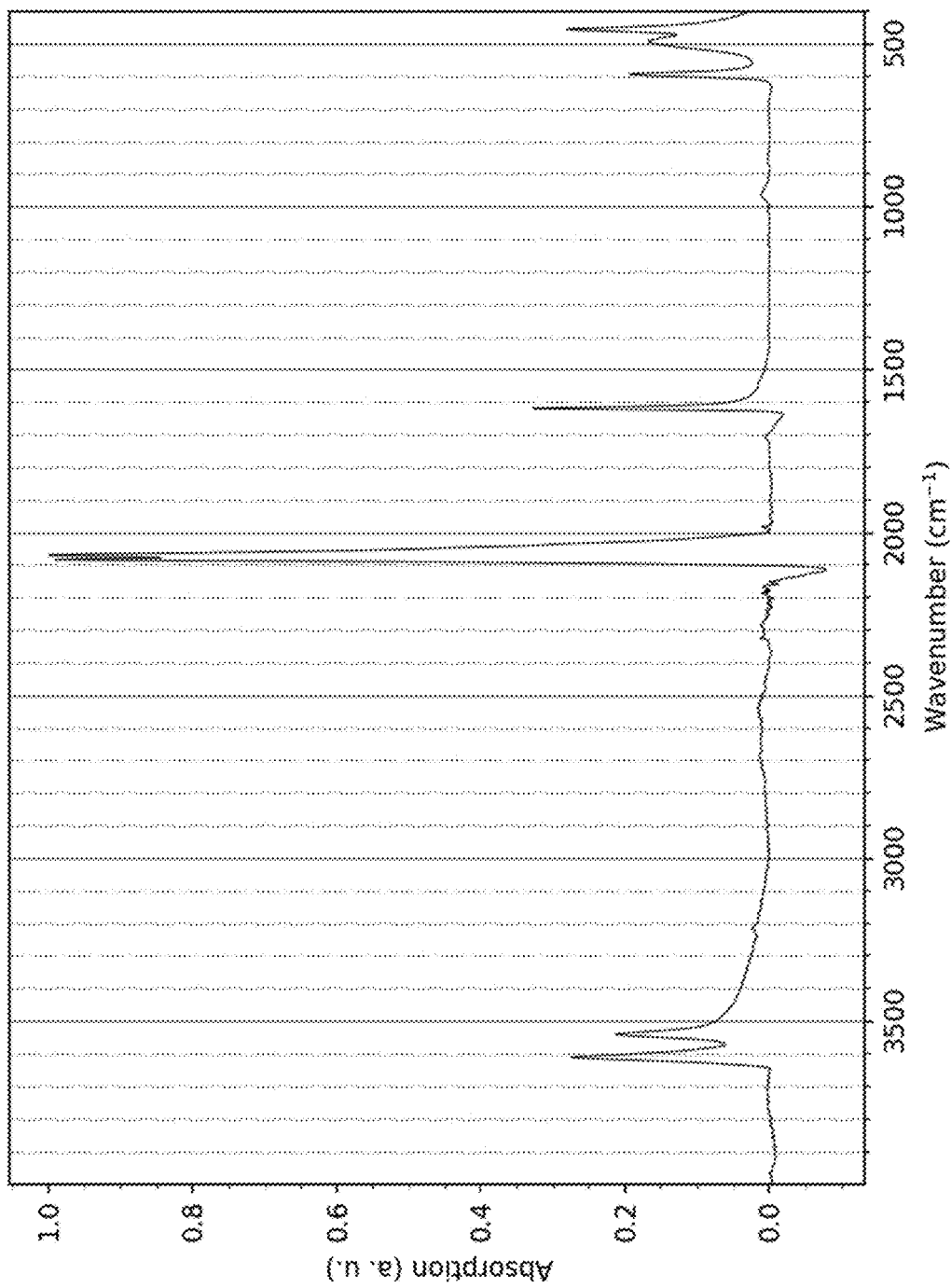
Figure 27:
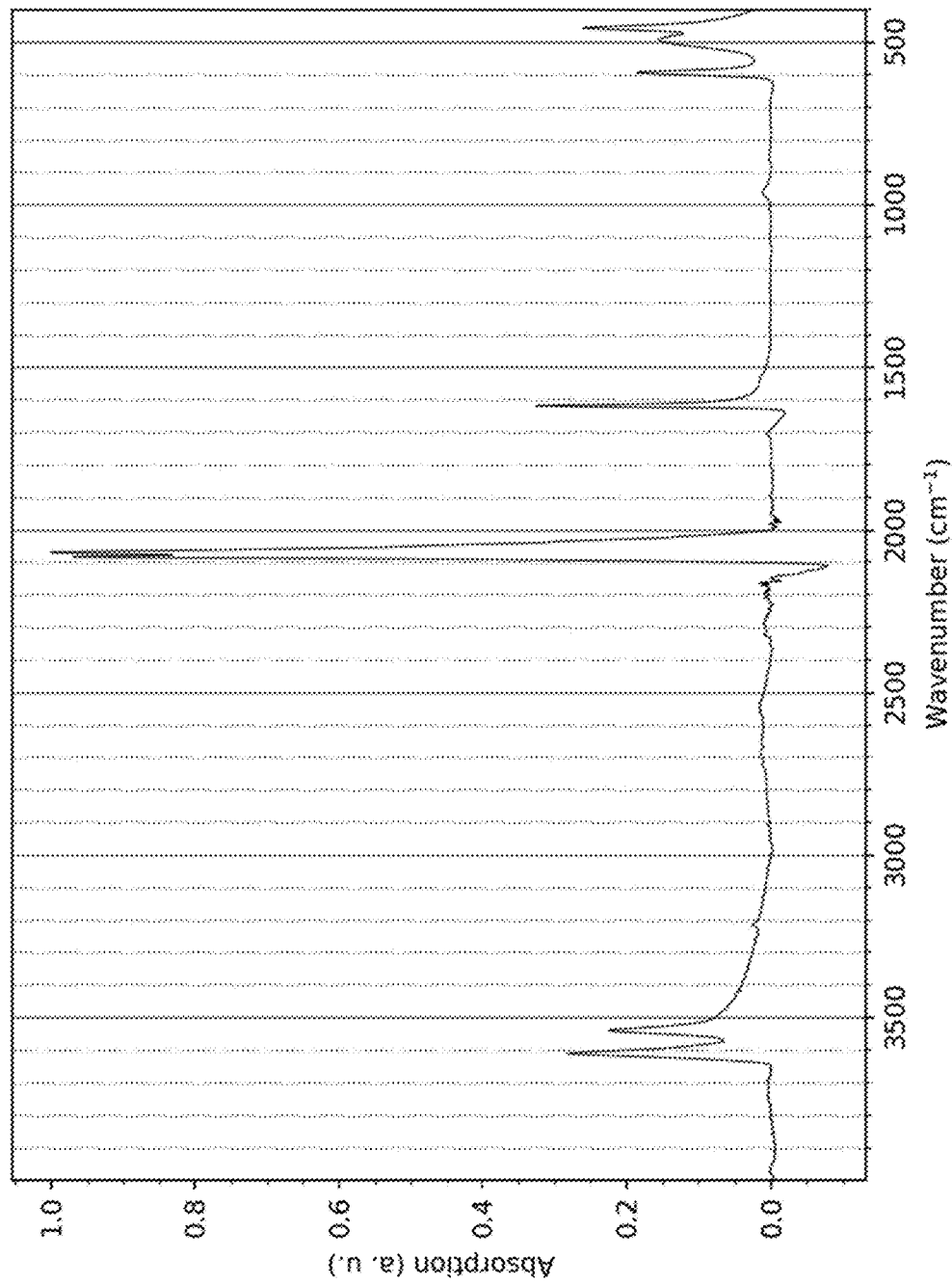
Figure 28:
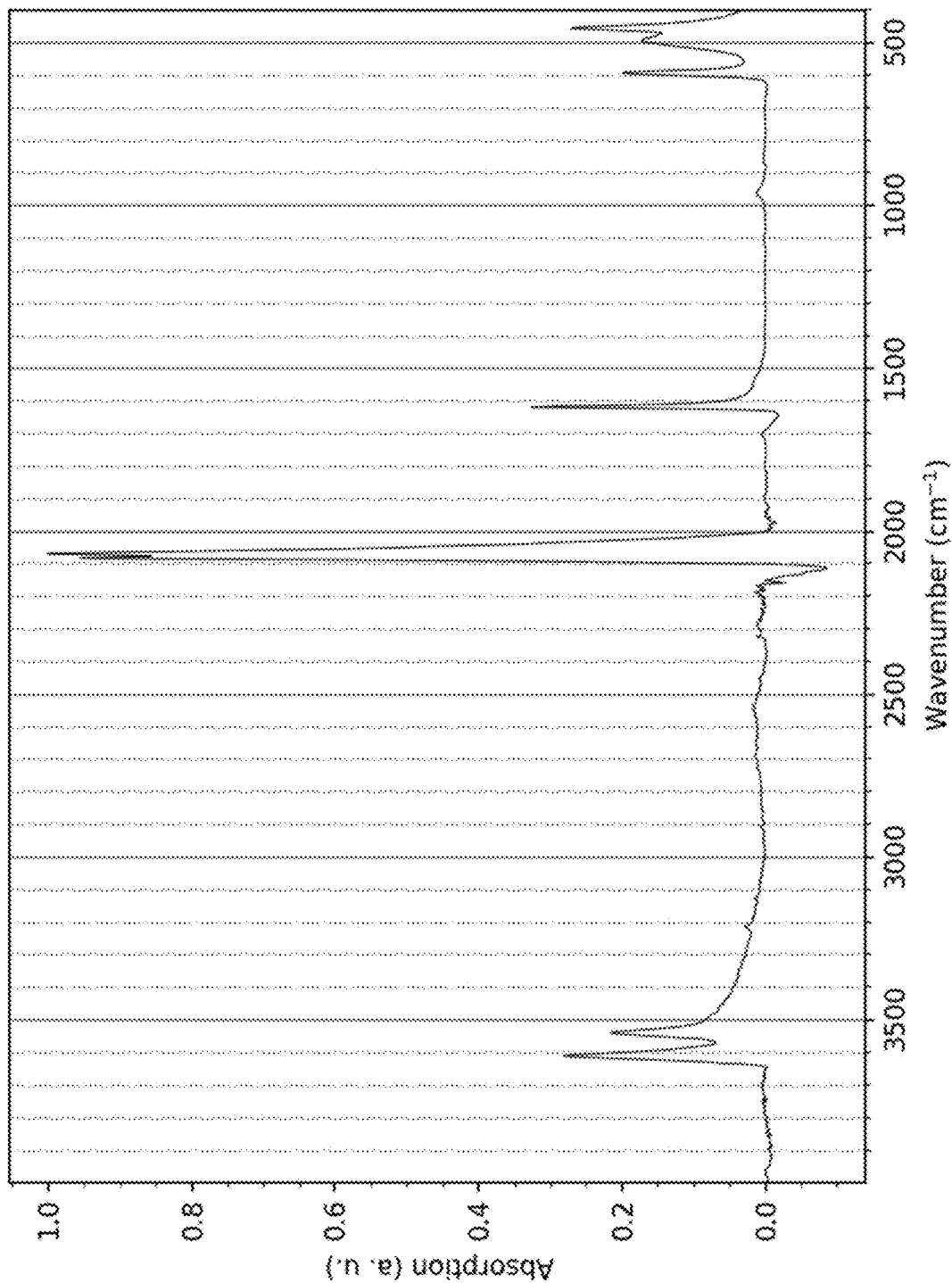
Figure 29:
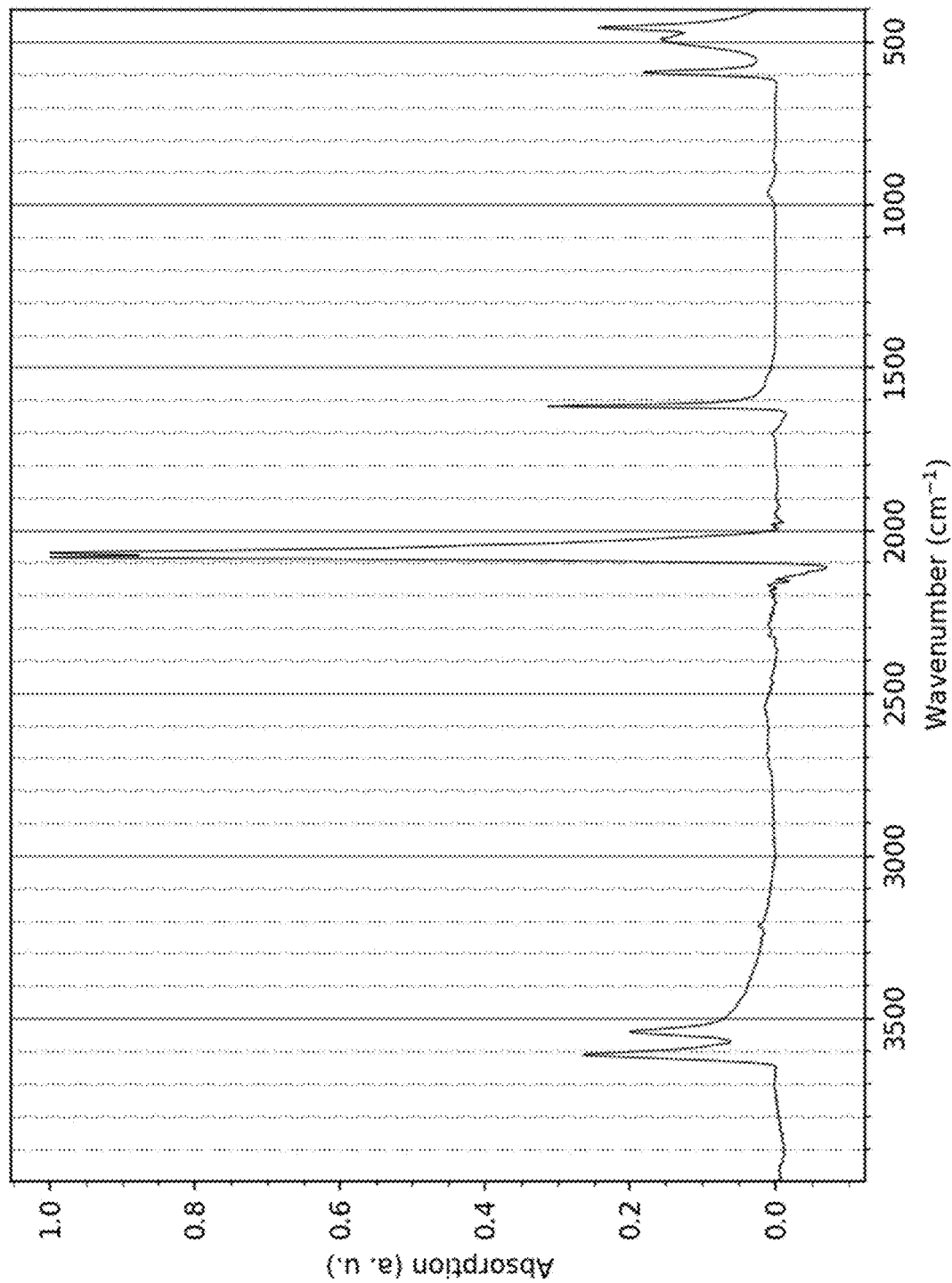
Figure 30:
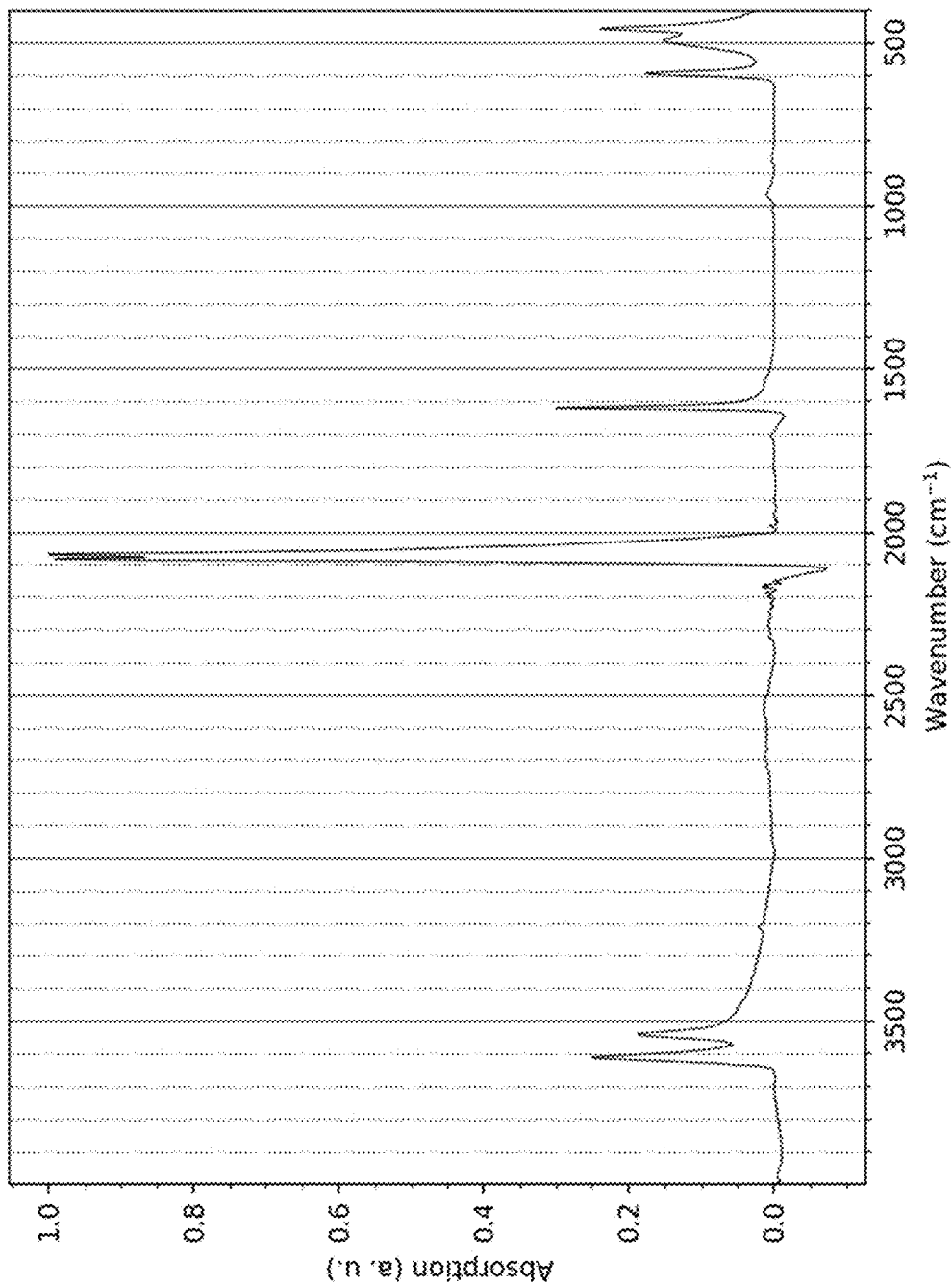
Figure 31:
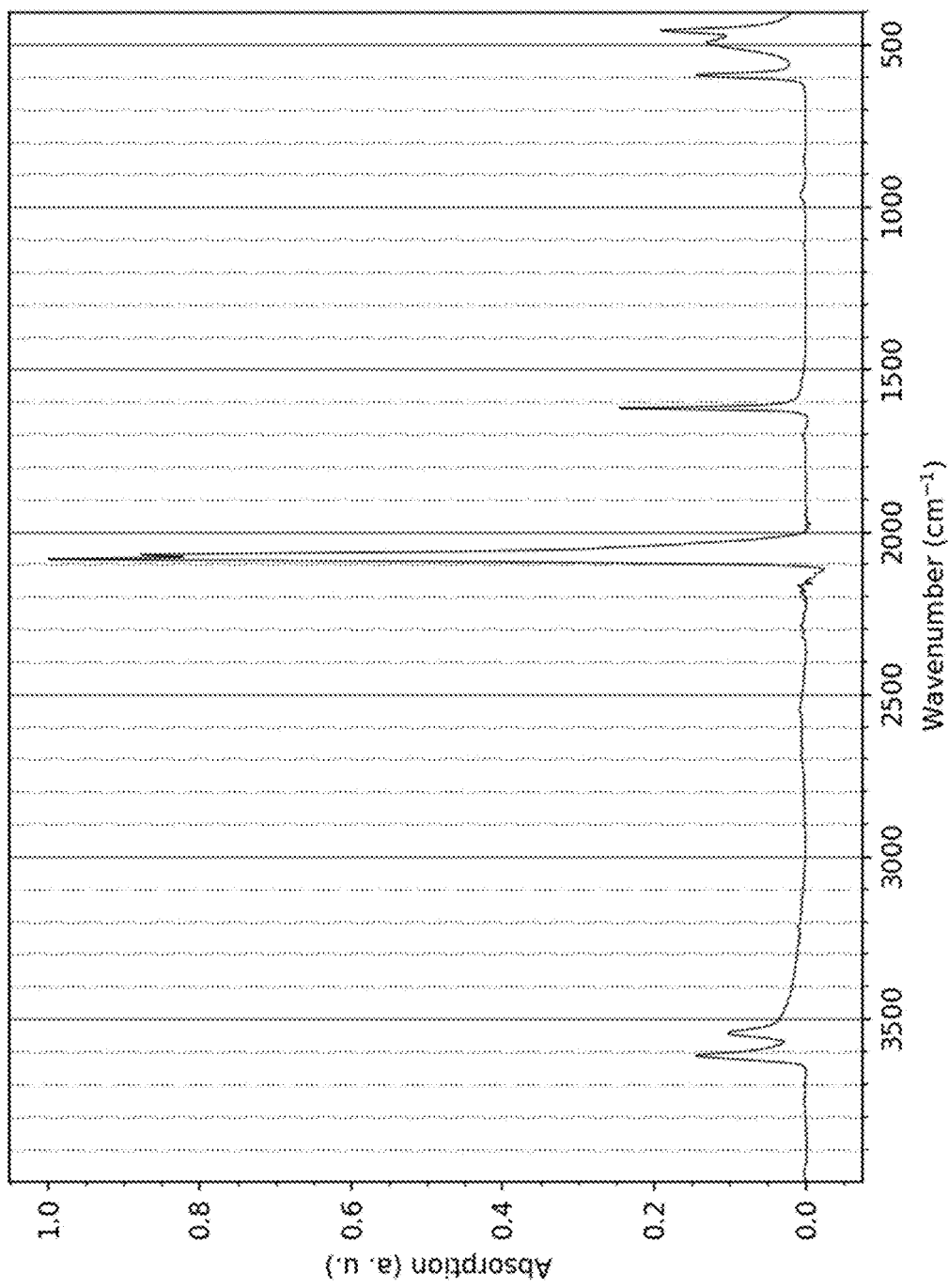
Figure 32:
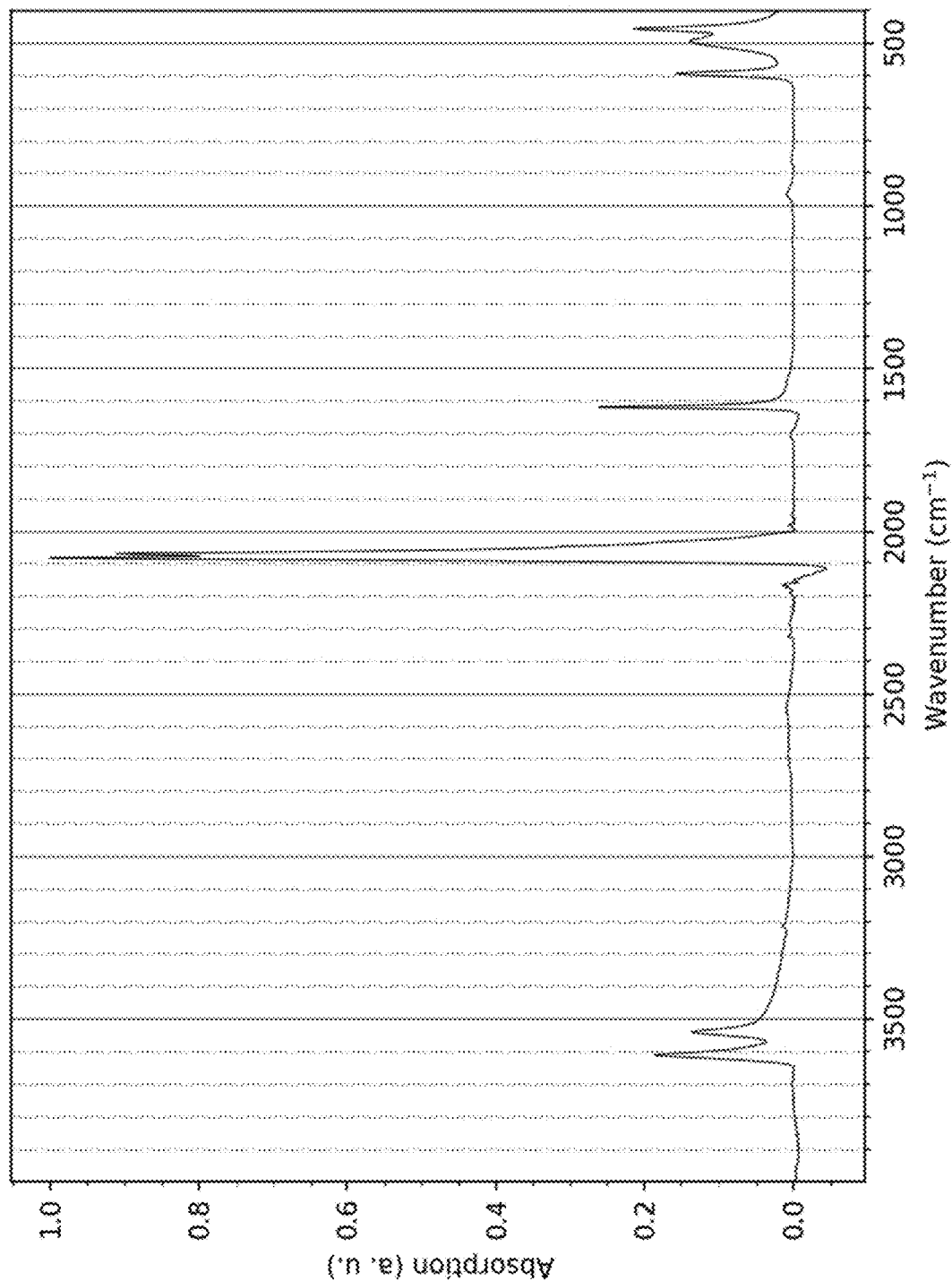
Figure 33:
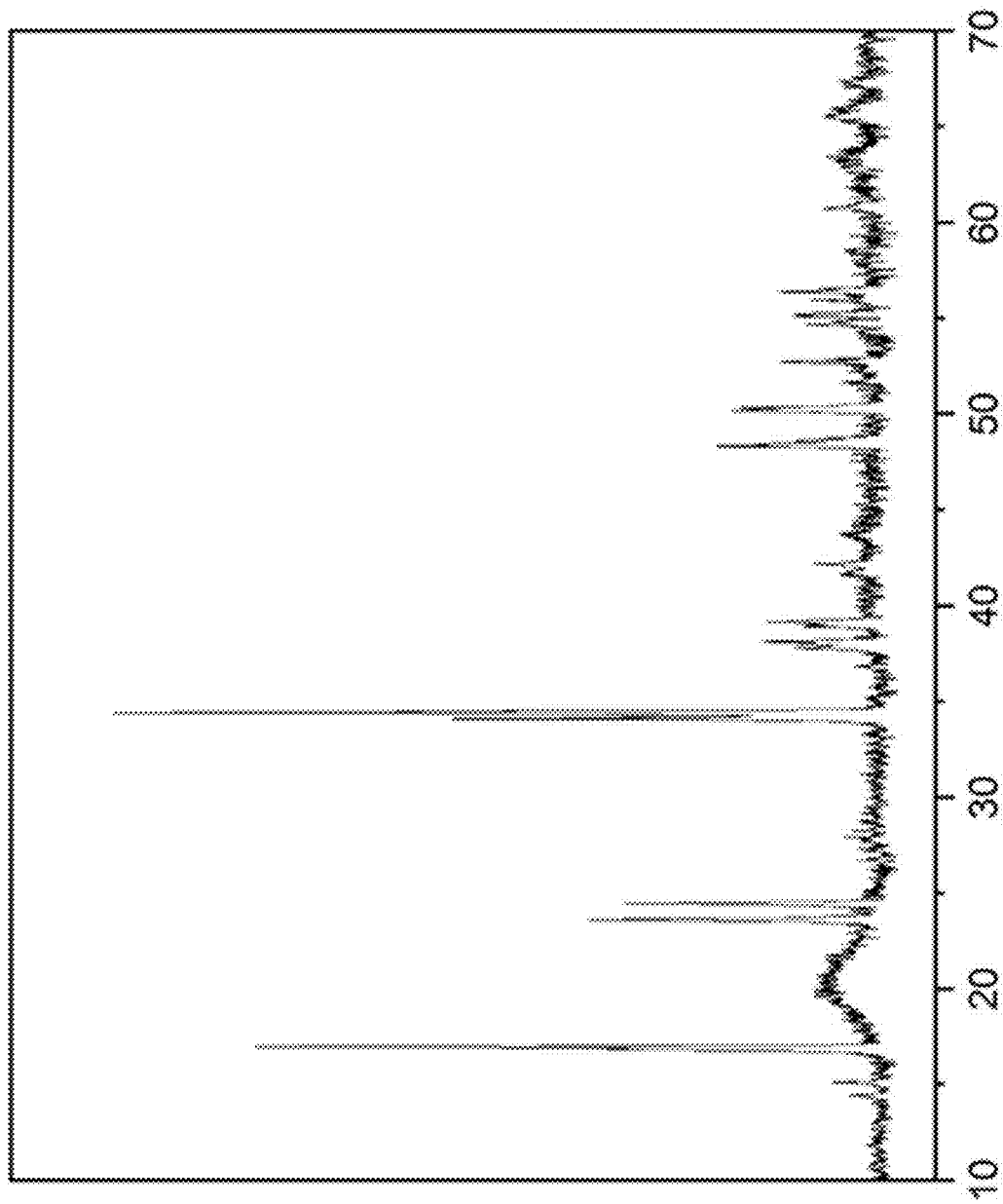
FIG. 33 illustrates a chart of an x-ray diffraction (XRD) pattern of the TMCCC obtained in Example 1.

FIG. 1 illustrates a process for producing Prussian White using formic acid and recovering byproducts; FIG. 2 illustrates a graph representing an electrochemical performance (constant-current charge/discharge profile) of the TMCCC obtained in Example 1; FIG. 3 illustrates a graph representing an electrochemical performance (constant-current charge/discharge profile) of the TMCCC obtained in Example 7, measured in a three-electrode cell with an activated carbon counter-electrode and an activated carbon fiber mesh reference electrode; FIG. 4 illustrates a graph representing an electrochemical performance (constant-current charge/discharge profile) of the TMCCC obtained in Example 7, measured in a two-electrode cell with a TMCCC cathode and an activated carbon counter-electrode; FIG. 5 illustrates a graph representing an electrochemical performance (constant-current charge/discharge voltage profile) of the TMCCC obtained in Example 9; FIG. 6-FIG. 17 illustrate scanning electron microscope (SEM) images demonstrating a morphology and particle size of the TMCCC Examples 1-12; FIG. 18 illustrates a particle size distribution, as determined through laser diffraction measurements, of the TMCCC obtained in Example 1; FIG. 19 illustrates a particle size distribution, as determined through laser diffraction measurements, of the TMCCC obtained in Example 2; FIG. 20 illustrates a particle size distribution, as determined through laser diffraction measurements, of the TMCCC obtained in example 7; FIG. 21-FIG. 32 illustrate attenuated total reflection Fourier-transform infrared spectrums of the TMCCC obtained in Example 1-Example 12; FIG. 33 illustrates a chart of an x-ray diffraction (XRD) pattern of the TMCCC obtained in Example 1; and FIG. 34 illustrates a generic electrochemical cell constructed with one or more electrically-conductive structures.

Electrochemical performance of Prussian White is closely related to its composition of matter, more specifically the abundance of vacancies in its crystal lattice. It is known that during the conventional precipitation process, large amounts of Fe(CN)$_6$ vacancies occupied by coordinated water will exist in the crystal framework. Vacancies as positively charged defects significantly reduce specific capacity and cause structural instability. In addition to the effect of vacancies on the chemical composition, the active material particle size significantly impacts both the production process and the final performance of the battery. Another crucial physical property of electrode materials, tap density, which indicates how tightly powder particles can pack together when subjected to mechanical tapping, essentially measuring the maximum amount of active material that can be packed into a given volume, directly impacts the volumetric energy density of the battery cell.

Some embodiments of the present invention may describe a novel TMCCC synthesis method (FIG. 1) for controlling each of the properties of particle size, tap density, low vacancy content, and high specific capacity during the production of iron-only TMCCC. In said synthesis method, the TMCCC for electrochemical energy storage devices is made by the decomposition of Na$_4$Fe(CN)$_6$·10 H$_2$O using tripartite agent (acid, ligand and reducing agent) and further reduced with sodium dithionite.

A method to produce TMCCC by decomposition of Na Fe(CN)$_6$·10 H$_2$O using hydrochloric acid has been reported in REF[1]. The method in REF[1] requires reaction times between 12 and 24 hours. It further requires a second process step, in which the dried product from the decomposition step is re-suspended in organic solvents and treated with sodium halides such as sodium iodide for further reduction. REF[2] describes a use of hydrochloric acid for decomposition and sodium borohydride and ethanol water mixture for reduction.

The use of hydrochloric acid is highly disadvantageous, because it requires glass-lined reactors or reactors made with special corrosion-resistant alloys to prevent severe corrosion of stainless steel in contact with chloride-containing reaction media. The use of sodium halide reduction agents poses additional safety and waste disposal concerns for the elemental iodine or bromine byproducts. In summary, none of these references describe a cost-effective scalable synthesis method with control of particle size and tap density of TMCCC. The present invention relates to a non-tedious and cost-effective method of synthesis using recyclable formic acid (FIG. 1) as acid, reducing and chelating agent to produce high quality Fe-only TMCCC. Also, this invention describes a synthesis method in which a novel class of aqueous-based sulfur-containing reducing agents is used to convert partially sodiated Prussian White to Prussian White with high sodium content for electrochemical energy storage devices.

This invention generally relates to electrochemical cells and, more particularly, to a scalable method for synthesizing a Prussian White TMCCC of the general formula Na$_x$Fe$_y$[Fe(CN)$_6$]$_{1-z}$ n H$_2$O, wherein 0<x≤2.0, y=1.0, 0≤z<0.2, 0≤n<3.0 (Formula I), more preferably z<0.05 and even more preferably z<0.01, for use in battery electrically conductive structures. This material is mostly prepared by controlled decomposition of sodium hexacyanoferrate decahydrate where formic acid is added to a reaction vessel that contains a solution of sodium hexacyanoferrate decahydrate and water. The particle size distribution is controlled by modulation of nucleation rate and separating the stages of nucleation and growth. The final step of sodiation of Prussian White involves the use of an aqueous buffer and a reducing agent.

The prepared materials exhibit high capacity (FIG. 2-FIG. 5) and facilitate the commercialization of sodium-ion batteries. Moreover, the benefit of this synthetic strategy extends to recycling of the products sodium formate and hydrogen cyanide (FIG. 1).

The controlled decomposition synthesis was efficiently achieved, ensuring precise control of particle size and morphology. This efficiency is reflected in the structural uniformity observed in scanning electron microscopy (SEM) images (FIG. 6-17) and in the particle size distribution analysis (FIG. 18-19 and Table 1). The well-defined decomposition process enhances material properties that enable the application in electrochemical energy storage devices, where control of particle size is crucial.

The relationship between tap density and D$_{50}$ (median particle size) observed for the materials of the embodiments of this invention reflects the effectiveness of the synthesis technique in controlling material density. One skilled in the art will recognize that a correlation in which tap density increases with increasing particle size is not a generally occurring phenomenon in particle systems; in fact, many examples exist where the opposite correlation may be observed, such as with fumed silica or carbon black materials. The observed correlation in some embodiments of the present invention highlights the ability of the synthesis method to separately control the rates of initial homogenous nucleation, heterogeneous nucleation, particle-particle aggregation, and particle growth, making it a versatile approach for optimizing the material for best volumetric energy density.

The composition of the synthesized TMCCC samples was analyzed using inductively coupled plasma optical emission spectroscopy (ICP-OES) and the vacancy content is calculated accordingly (Table 1). The results indicated zero to low vacancy content, confirming the material's suitability for high-performance energy storage applications. In some examples, parameters were near a detection limit of the equipment used with the result that summary information may not be included; while such examples were consistent with the data presented herein.

Additional characterization of the synthesized compound, including attenuated total reflection Fourier-transform infrared spectroscopy (ATR-FTIR) (FIG. 21-FIG. 32) and powder x-ray diffraction (XRD) analysis (FIG. 33), is reported. The XRD results confirm that the phase of the TMCCC material is monoclinic.

Table 1 summarizes a set of elemental compositions, $D_{50}$ and tap density of selected example TMCCC. The TMCCC examples correspond to Formula I: $Na_xFe_y[Fe(CN)_6]_{1-z} \cdot n\,H_2O$, wherein $0<x\leq2.0$, $y=1.0$, $0\leq z<0.2$, $0\leq n<3.0$.

TABLE 1

| | $Na_xFe_y[Fe(CN)_6]_{1-z} \cdot n\,H_2O$ | | | | | | Tap |
|---|---|---|---|---|---|---|---|
| EXAMPLE | x<br>$Na^+$ | y<br>$Fe^{2+/3+}$ | 1-z<br>$[Fe(CN)6]^{4-}$ | z<br>Vacancy | n<br>$H_2O$ | D50<br>(µm) | Density<br>(g/cm$^3$) |
| 1 | 1.94 | 1.00 | 0.985 | 0.015 | 1.80 | 7.6 | (NM) |
| 2 | 1.98 | 1.00 | 0.995 | 0.005 | 1.89 | 12.2 | 0.616 |
| 4 | 2.00 | 1.00 | 1.00 | 0.000 | 1.77 | 20.7 | 0.889 |
| 5 | 1.98 | 1.00 | 0.994 | 0.006 | 1.71 | 23.4 | 0.896 |
| 6 | 1.96 | 1.00 | 0.990 | 0.010 | 1.95 | 22.7 | 0.820 |
| 7 | 1.99 | 1.00 | 0.997 | 0.003 | 1.94 | 24.0 | 0.862 |

In the table above, "NM" used in the Tap Density column means that the parameter was not measured.

EXPERIMENTAL SECTION

Example 1

Under inert atmosphere, formic acid (50 g) was gradually added at a constant rate over 20 seconds to a stirred solution containing sodium hexacyanoferrate (II) decahydrate (262 g), water (2000 g), and sodium sulfate (5 g) in a flask maintained at 80° C., with a stirring rate of 200 rpm. The mixture was held at 80° C. for 1 hour while stirring at the same rate.

Subsequently, an additional 100 g of formic acid was introduced at a constant rate over 3 hours while maintaining the same temperature and stir rate. Next the solution was held for 20 minutes and cooled, filtered and washed with water (200 g). Then the wet powder was transferred to a flask containing succinic acid (5.8 g), sodium hydroxide (1.9 g) and water (900 g). After mixing thoroughly, sodium dithionite (11 g) was added. The reaction mixture was then stirred for 20 minutes and filtered and washed with water (600 g) and methanol (100 g) to yield Prussian White powder. The isolated material was dried at 80° C. under vacuum in an inert atmosphere for 18 hours.

Example 2

Under inert atmosphere, formic acid (50 g) was gradually added at a constant rate over 3 minutes to a stirred solution containing sodium hexacyanoferrate (II) decahydrate (262 g), water (2000 g), and sodium sulfate (5 g) in a flask maintained at 80° C., with a stirring rate of 200 rpm. The mixture was held at 80° C. for 1 hour while stirring at the same rate.

Subsequently, an additional 100 g of formic acid was introduced at a constant rate over 3 hours while maintaining the same temperature and stir rate. Next the solution was held for 20 minutes and cooled, filtered and washed with water (200 g). Then the wet powder was transferred to a flask containing succinic acid (5.8 g), sodium hydroxide (1.9 g) and water (900 g). After mixing thoroughly, sodium dithionite (11 g) was added. The reaction mixture was then stirred for 20 minutes and filtered and washed with water (600 g) and methanol (100 g) to yield Prussian White powder. The isolated material was dried at 80° C. under vacuum in an inert atmosphere for 18 hours.

Example 3

Under inert atmosphere, formic acid (12 g) was gradually added at a constant rate over 12 minutes to a stirred solution containing sodium hexacyanoferrate (II) decahydrate (262 g), water (2000 g), and sodium sulfate (5 g) in a flask maintained at 80° C., with a stirring rate of 200 rpm. The mixture was held at 80° C. for 48 minutes while stirring at the same rate.

Subsequently, an additional 138 g of formic acid was introduced at a constant rate over 3 hours while maintaining the same temperature and stir rate. Next the solution was held for 20 minutes and cooled, filtered and washed with water (200 g). Then the wet powder was transferred to a flask containing succinic acid (5.8 g), sodium hydroxide (1.9 g) and water (900 g). After mixing thoroughly, sodium dithionite (11 g) was added. The reaction mixture was then stirred for 20 minutes and filtered and washed with water (600 g) and methanol (100 g) to yield Prussian White powder. The isolated material was dried at 80° C. under vacuum in an inert atmosphere for 18 hours.

Example 4

Under inert atmosphere, formic acid (12 g) was gradually added at a constant rate over 24 minutes to a stirred solution containing sodium hexacyanoferrate (II) decahydrate (262 g), water (2000 g), and sodium sulfate (5 g) in a flask maintained at 80° C., with a stirring rate of 200 rpm. The mixture was held at 80° C. for 36 minutes while stirring at the same rate.

Subsequently, an additional 138 g of formic acid was introduced at a constant rate over 3 hours while maintaining the same temperature and stir rate. Next the solution was held for 20 minutes and cooled, filtered and washed with water (200 g). Then the wet powder was transferred to a flask containing succinic acid (5.8 g), sodium hydroxide (1.9 g) and water (900 g). After mixing thoroughly, sodium dithionite (11 g) was added. The reaction mixture was then stirred for 20 minutes and filtered and washed with water (600 g) and methanol (100 g) to yield Prussian White powder. The isolated material was dried at 80° C. under vacuum in an inert atmosphere for 18 hours.

Example 5

Under inert atmosphere, formic acid (12 g) was gradually added at a constant rate over 48 minutes to a stirred solution containing sodium hexacyanoferrate (II) decahydrate (262 g), water (2000 g), and sodium sulfate (5 g) in a flask maintained at 80° C., with a stirring rate of 200 rpm. The mixture was held at 80° C. for 12 minutes while stirring at the same rate.

Subsequently, an additional 138 g of formic acid was introduced at a constant rate over 3 hours while maintaining the same temperature and stir rate. Next the solution was held for 20 minutes and cooled, filtered and washed with water (200 g). Then the wet powder was transferred to a flask containing succinic acid (5.8 g), sodium hydroxide (1.9 g) and water (900 g). After mixing thoroughly, sodium dithionite (11 g) was added. The reaction mixture was then stirred for 20 minutes and filtered and washed with water (600 g) and methanol (100 g) to yield Prussian White powder. The isolated material was dried at 80° C. under vacuum in an inert atmosphere for 18 hours.

Example 6

Under inert atmosphere, 1 g of formic acid diluted in 2 g of water was gradually added at a constant rate over 24 minutes to a stirred solution containing sodium hexacyanoferrate (II) decahydrate (262 g), water (2000 g), and sodium sulfate (5 g) in a flask maintained at 80° C., with a stirring rate of 200 rpm. The mixture was held at 80° C. for 36 minutes while stirring at the same rate. Subsequently, an additional 149 g of formic acid was introduced at a constant rate over 3 hours while maintaining the same temperature and stir rate. Next the solution was held for 20 minutes and cooled, filtered and washed with water (200 g). Then the wet powder was transferred to a flask containing succinic acid (5.8 g), sodium hydroxide (1.9 g) and water (900 g). After mixing thoroughly, sodium dithionite (11 g) was added. The reaction mixture was then stirred for 20 minutes and filtered and washed with water (600 g) and methanol (100 g) to yield Prussian White powder. The isolated material was dried at 80° C. under vacuum in an inert atmosphere for 18 hours.

Example 7

Under inert atmosphere, formic acid (12 g) was gradually added at a constant rate over 90 minutes to a stirred solution containing sodium hexacyanoferrate (II) decahydrate (262 g), water (2000 g), and sodium sulfate (5 g) in a flask maintained at 80° C., with a stirring rate of 200 rpm. The mixture was held at 80° C. for 30 minutes while stirring at the same rate. Subsequently, an additional 138 g of formic acid was introduced at a constant rate over 2 hours while maintaining the same temperature and stir rate. Next the solution was held for 20 minutes and cooled, filtered and washed with water (200 g). Then the wet powder was transferred to a flask containing succinic acid (5.8 g), sodium hydroxide (1.9 g) and water (900 g). After mixing thoroughly, sodium dithionite (11 g) was added. The reaction mixture was then stirred for 20 minutes and filtered and washed with water (600 g) and methanol (100 g) to yield Prussian White powder. The isolated material was dried at 80° C. under vacuum in an inert atmosphere for 18 hours.

Example 8

Under inert atmosphere, formic acid (6 g) was gradually added at a constant rate over 24 minutes to a stirred solution containing sodium hexacyanoferrate (II) decahydrate (262 g) and water (1000 g) in a flask maintained at 85° C., with a stirring rate of 200 rpm. The mixture was held at 85° C. for 36 minutes while stirring at the same rate. Subsequently, an additional 181 g of formic acid was introduced at a constant rate over 2 hours while maintaining the same temperature and stir rate. Next the solution was held for 20 minutes and cooled, filtered and washed with water (200 g). Then the wet powder was transferred to a flask containing succinic acid (2.9 g), sodium hydroxide (0.95 g) and water (900 g).

After mixing thoroughly, sodium dithionite (5.5 g) was added. The reaction mixture was then stirred for 20 minutes and filtered and washed with water (600 g) and methanol (100 g) to yield Prussian White powder. The isolated material was dried at 80° C. under vacuum in an inert atmosphere for 18 hours.

Example 9

Under inert atmosphere, formic acid (3 g) was gradually added at a constant rate over 24 minutes to a stirred solution containing sodium hexacyanoferrate (II) decahydrate (262 g) and water (1000 g) in a flask maintained at 85° C., with a stirring rate of 200 rpm. The mixture was held at 85° C. for 36 minutes while stirring at the same rate. Subsequently, an additional 184 g of formic acid was introduced at a constant rate over 3 hours while maintaining the same temperature and stir rate. Next the solution was held for 20 minutes and cooled, filtered and washed with water (200 g). Then the wet powder was transferred to a flask containing succinic acid (2.9 g), sodium hydroxide (0.95 g) and water (900 g).

After mixing thoroughly, sodium dithionite (5.5 g) was added. The reaction mixture was then stirred for 20 minutes and filtered and washed with water (600 g) and methanol (100 g) to yield Prussian White powder. The isolated material was dried at 80° C. under vacuum in an inert atmosphere for 18 hours.

Example 10

Under inert atmosphere, formic acid (3 g) was gradually added at a constant rate over 24 minutes to a stirred solution containing sodium hexacyanoferrate (II) decahydrate (262 g) and water (1000 g) in a flask maintained at 85° C., with a stirring rate of 200 rpm. The mixture was held at 85° C. for 36 minutes while stirring at the same rate. Subsequently, an additional 184 g of formic acid was introduced at a constant rate over 1 hours while maintaining the same temperature and stir rate. Next the solution was held for 2 hours and 20 minutes and cooled, filtered and washed with water (200 g). Then the wet powder was transferred to a flask containing succinic acid (2.9 g), sodium hydroxide (0.95 g) and water (900 g). After mixing thoroughly, sodium dithionite (5.5 g) was added. The reaction mixture was then stirred for 20 minutes and filtered and washed with water (600 g) and methanol (100 g) to yield Prussian White powder. The isolated material was dried at 80° C. under vacuum in an inert atmosphere for 18 hours.

Example 11

Under inert atmosphere, acetic acid (7.8 g) was gradually added at a constant rate over 24 minutes to a stirred solution containing sodium hexacyanoferrate (II) decahydrate (262 g) and water (1000 g) in a flask maintained at 85° C., with a stirring rate of 200 rpm. The mixture was held at 85° C. for 36 minutes while stirring at the same rate. Subsequently, an additional 238.5 g of acetic acid was introduced at a constant rate over 3 hours while maintaining the same temperature and stir rate. Next the solution was held for 20 minutes and cooled, filtered and washed with water (200 g). Then the wet powder was transferred to a flask containing succinic acid (2.9 g), sodium hydroxide (0.95 g) and water (900 g).

After mixing thoroughly, sodium dithionite (5.5 g) was added. The reaction mixture was then stirred for 20 minutes and filtered and washed with water (600 g) and methanol (100 g) to yield Prussian White powder. The isolated material was dried at 80° C. under vacuum in an inert atmosphere for 18 hours.

Example 12

Under inert atmosphere, a solution of sodium hexacyanoferrate (II) decahydrate (262 g) and water (800 g) was gradually added at a constant rate over 4 hours to a stirred solution containing formic acid (262 g) and water (200 g) in a flask maintained at 85° C., with a stirring rate of 200 rpm. The mixture was held at 85° C. for 20 minutes while stirring at the same rate and cooled, filtered and washed with water (200 g). Then the wet powder was transferred to a flask containing succinic acid (2.9 g), sodium hydroxide (0.95 g) and water (900 g). After mixing thoroughly, sodium dithionite (5.5 g) was added. The reaction mixture was then stirred for 20 minutes and filtered and washed with water (600 g) and methanol (100 g) to yield Prussian White powder. The isolated material was dried at 80° C. under vacuum in an inert atmosphere for 18 hours.

Electrode Preparation

The slurry for electrode casting was prepared by mixing active material, conducting carbon additive and polymeric binder to obtain a smooth, flowable slurry.

This slurry was deposited onto a carbon-coated aluminum foil current collector using a drawdown coater and dried at 60° C. for 30 minutes. The ensuing coat was calendered (roll pressed) to further increase its density, vacuum dried, and cut into electrodes for use in electrochemical cells. The TMCCC electrodes were paired with activated carbon electrodes and then assembled into electrochemical cells containing a porous separator, and an electrolyte. The cells were vacuum sealed, massaged and left to soak overnight to enable impregnation of electrolyte through the pores before electrochemical testing. The cell then went through a charge and discharge at a rate of C/5.

Furthermore, several electrodes were dried in a vacuum oven at more than 100° C. for a day to obtain fully dried electrodes with no water in the active material. These electrodes were assembled with an electrolyte, for example a mixture of ethylene carbonate and diethyl carbonate. Activated charcoal electrodes were used as counter-electrodes. Since the charcoal counter electrode represents a capacitor half-cell, the resulting cell voltage profiles contain a linear slope and the initial cell voltage of −0.12 V corresponds to the initial potential difference of the fully discharged (fully sodiated) TMCCC (2.55 V) and the equilibrium potential of the activated carbon electrode prior to charging (2.67 V vs. Na/Na$^+$).

Three-electrode cells were prepared with the addition of a carbon cloth reference electrode in the same pouch cell format, separator and electrolyte components. The electrochemical potential of the TMCCC is measured against the activated carbon fiber mesh electrode and converted to the potential against the Na/Na$^+$ redox couple.

Cell Testing

The cells were compressed under 10 psi and tested on a chamber at 25° C. Testing starts with a full discharge at a rate of C/10 followed by a full cycle at the same current for both charge and discharge.

FIG. 34 illustrates a generic electrochemical cell 3400. Cell 3400 includes a first electrode 3405 (e.g., a cathode electrode), a second electrode 3410 (e.g., an anode electrode), a liquid electrolyte 3415, a separator 3420, a first current collector 3425, and a second current collector 3430. One or both electrically conductive structures, e.g., electrodes, include a coordination compound, and more specifically a transition metal cyanide coordination compound.

REFERENCES

The following references are cited herein, and each of which is hereby expressly incorporated by reference thereto in its entirety for all purposes:

REF[1]: Brant, William, Ronnie Mogensen, Reza Younesi, and Féres Dehchar. "Method of producing a sodium iron (II)-hexacyanoferrate (II) material." U.S. Pat. No. 10,899, 632. 26 Jan. 2021.

REF[2]: Lim, Cheryldine Q X, and Zhi-Kuang Tan. "Prussian White with near-maximum specific capacity in sodium-ion batteries." ACS Applied Energy Materials 4.6 (2021): 6214-6220.

REF[3]: Alexander BUCKEL, Mikael Svensson, Ronnie Mogensen, Le Anh M A. "Sodium iron(ii)-hexacyanoferrate(ii) material". WO2023217705A1, Filing date: 2023 May 8.

The system and methods above have been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention is not limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A method of producing a target Prussian White transition metal cyanide coordination compound (TMCCC) of the general formula $Na_xFe_y[Fe(CN)_6]_{1-z} \cdot n\ H_2O$, wherein $0<x\leq2.0$, $y=1.0$, $0\leq z<0.2$, $0\leq n<3.0$, comprising the steps of:
    (a) admixing sodium hexacyanoferrate (II) decahydrate and water to produce the initial reaction mixture;
    (b) adding a first quantity of formic acid to the reaction mixture obtained in (a) in a period of time at a temperature T to produce the reaction mixture at its second stage;
    (c) holding the reaction mixture obtained in (b) for a period of time at a temperature T to produce reaction mixture at its third stage;
    (d) adding to the reaction mixture obtained in (c) a second quantity of formic acid over a period of time at a temperature T to produce reaction mixture at its fourth stage;
    (e) holding the reaction mixture obtained in (d) for a period of time at a temperature T to produce reaction mixture at its final stage;
    (f) filtering and solvent washing the reaction product obtained in (e) to obtain a TMCCC;
    (g) admixing a buffer and said TMCCC obtained in (f) to produce a reaction mixture; and
    (h) contacting the reaction mixture obtained in (g) with a sulfur-containing reducing agent to produce the target Prussian White TMCCC;
    (i) filtering and solvent washing the reaction product obtained in (h) to produce a fully sodiated TMCCC; and
    (j) drying the reaction product obtained in (i) to produce a dry powder of said fully sodiated TMCCC.

2. The method of claim 1, wherein the buffer is prepared from sodium hydroxide and succinic acid.

3. The method of claim 1, wherein the sulfur-containing reducing agent is selected from the group consisting of sodium dithionite, tetraethylammonium dithionite, sodium hydroxymethanesulfinate, thiourea dioxide and N, N-dimethyl thiourea dioxide.

4. The method of claim 1, wherein one or both of step (f) and step (i) includes a solvent selected from the group consisting of water, methanol, ethanol or mixtures thereof.

5. The method of claim 1, wherein one or more of said steps of admixing are performed at a temperature T between about 20° C. and about 150° C.

6. The method of claim 1, wherein one or more of said steps of admixing are performed at a period of time between about 20 seconds and about 8 hours.

7. The method of claim 1 wherein the Prussian White in (h) includes a TMCCC consisting essentially of Na, Fe, C, H, N, and O.

8. The method of claim 1, wherein said TMCCC in step (f) and step (j) includes a monoclinic, rhombohedral, cubic crystal structure, or mixtures thereof.

9. The method of claim 1, wherein the method of producing TMCCC is used to produce TMCCC with controlled vacancy content, particle size and tap density.

10. The method of claim 9, wherein the TMCCC is obtained with $x>1.92$, $y=1.00$, and $z<0.02$.

11. The method of claim 9, wherein the particle size distribution is controlled such that $D_{50}\geq15$ μm, and the tap density is controlled to be greater than 0.6 g/cm$^3$.

12. The method of claim 1 wherein $z<0.05$.

13. The method claim 1, further comprising:
    (k) processing the byproducts generated from one or more of steps (a)-(j) for use in one or more of steps (a)-(j).

14. A method of producing a target Prussian White transition metal cyanide coordination compound (TMCCC) of the general formula $Na_xFe_y[Fe(CN)_6]_{1-z} \cdot n\ H_2O$, wherein $0<x\leq2.0$, $y=1.0$, $0\leq z<0.2$, $0\leq n<3.0$, comprising the steps of:
    (a) decomposing, in a controlled manner, sodium hexacyanoferrate decahydrate in an aqueous solution using formic acid;
    (b) controlling a particle size distribution by modulation of nucleation rate and separating the stages of nucleation and growth producing an intermediate TMCCC; and
    (c) sodiating said intermediate TMCCC using an aqueous buffer and a reducing agent to obtain the target Prussian White TMCCC product.

15. The method of claim 14 wherein one or more of steps (a)-(c) produce a quantity of byproducts including sodium formate and/or hydrogen cyanide, further comprising the step of processing a portion of said quantity of byproducts for use in one or more of steps (a)-(c).

16. The method of claim 14 wherein $z<0.05$.

17. The method of claim 14 wherein said target Prussian White TMCCC product includes a controlled particle size distribution such that $D_{50} \geq 15$ μm, and a controlled tap density to be greater than 0.6 g/cm$^3$.

* * * * *